US011858775B2

(12) United States Patent
Igarashi et al.

(10) Patent No.: US 11,858,775 B2
(45) Date of Patent: Jan. 2, 2024

(54) PAPER SHEET DETECTION DEVICE, PAPER SHEET DETECTION METHOD, AND PAPER SHEET PROCESSING DEVICE

(71) Applicants: LAUREL BANK MACHINES CO., LTD., Tokyo (JP); LAUREL MACHINERY CO., LTD., Osaka (JP); LAUREL PRECISION MACHINES CO., LTD., Osaka (JP)

(72) Inventors: Osamu Igarashi, Tokyo (JP); Hitoshi Takahashi, Tokyo (JP); Toru Inake, Tokyo (JP)

(73) Assignees: LAUREL BANK MACHINES CO., LTD., Tokyo (JP); LAUREL MACHINERY CO., LTD., Osaka (JP); LAUREL PRECISION MACHINES CO., LTD., Osaka (JP)

( * ) Notice: Subject to any disclaimer, the term of this patent is extended or adjusted under 35 U.S.C. 154(b) by 317 days.

(21) Appl. No.: 17/438,837

(22) PCT Filed: Mar. 11, 2020

(86) PCT No.: PCT/JP2020/010484
§ 371 (c)(1),
(2) Date: Sep. 13, 2021

(87) PCT Pub. No.: WO2020/184608
PCT Pub. Date: Sep. 17, 2020

(65) Prior Publication Data
US 2022/0153546 A1 May 19, 2022

(30) Foreign Application Priority Data
Mar. 14, 2019 (JP) .................. 2019-047278

(51) Int. Cl.
*B65H 7/14* (2006.01)
*G07D 7/121* (2016.01)

(52) U.S. Cl.
CPC ............... *B65H 7/14* (2013.01); *G07D 7/121* (2013.01); *B65H 2553/412* (2013.01);
(Continued)

(58) Field of Classification Search
CPC .. B65H 7/14; B65H 2553/40; B65H 2553/41; B65H 2553/412; B65H 2557/61;
(Continued)

(56) References Cited

U.S. PATENT DOCUMENTS 5,896,192 A * 4/1999 Nagase .................. G07D 7/121
356/73
6,153,888 A * 11/2000 Fournier ................ B65H 7/125
356/429
(Continued)

FOREIGN PATENT DOCUMENTS

DE 102011102858 A1 12/2012
EP 0875866 A2 11/1998
(Continued)

OTHER PUBLICATIONS

Chinese Office Action dated Nov. 3, 2022 in Chinese Application No. 202080020710.4, with English translation, 20 pages.
(Continued)

*Primary Examiner* — Prasad V Gokhale
(74) *Attorney, Agent, or Firm* — Nixon & Vanderhye P.C.

(57) ABSTRACT

A paper sheet detection device includes: an optical sensor that includes a light-emitting portion that emits light, and a light-receiving portion that receives the emitted light; a storage portion that stores a first threshold value used for determining whether or not a paper sheet is present in a path of the emitted light, a target light-receiving level set as a
(Continued)

target value of a level of the light received by the light-receiving portion in a state where the paper sheet is not present, and a second threshold value that is set to a value that is greater than the first threshold value and less than the target light-receiving level; an estimating portion that determines whether the level of the light received by the light-receiving portion is equal to or greater than the first threshold value and less than the second threshold value, and that estimates whether or not the paper sheet is present; and a light amount adjusting portion that adjusts an amount of the light emitted by the light-emitting portion so that the level of the light received by the light-receiving portion becomes the target light-receiving level in the state where the paper sheet is not present when the estimating portion estimates that the paper sheet is not present after the estimating portion determines that the level of the light received by the light-receiving portion is equal to or greater than the first threshold value and less than the second threshold value.

10 Claims, 10 Drawing Sheets

(52) U.S. Cl.
CPC .. *B65H 2557/61* (2013.01); *B65H 2701/1712* (2013.01); *B65H 2701/1912* (2013.01); *G07D 2211/00* (2013.01)

(58) Field of Classification Search
CPC .... B65H 2701/1712; B65H 2701/1912; G07D 7/12; G07D 7/121; G07D 11/20; G07D 11/22; G07D 2211/00
See application file for complete search history.

(56) References Cited

U.S. PATENT DOCUMENTS

| | | |
|---|---|---|
| 2003/0043365 A1 | 3/2003 | Ross et al. |
| 2003/0081824 A1* | 5/2003 | Mennie .................... G07D 7/06 382/135 |
| 2013/0256987 A1 | 10/2013 | Miki et al. |
| 2014/0291914 A1* | 10/2014 | Tamura .................... B65H 3/44 271/265.01 |
| 2019/0049375 A1 | 2/2019 | Cook |

FOREIGN PATENT DOCUMENTS

| | | |
|---|---|---|
| EP | 3 373 255 | 9/2018 |
| JP | 01-223386 A | 9/1989 |
| JP | 2010-202307 A | 9/2010 |
| JP | 2013-131053 A | 7/2013 |
| JP | 2013-142969 A | 7/2013 |
| JP | 2014-182752 A | 9/2014 |
| JP | 2015-138437 | 7/2015 |
| JP | 2018-036874 | 7/2018 |
| JP | 2018-115039 A | 7/2018 |
| JP | 2018-144989 | 9/2018 |
| WO | WO 2011/082792 A1 | 7/2011 |

OTHER PUBLICATIONS

Extended European Search Report dated Nov. 21, 2022 in European Application No. 20769574.3, 8 pages.
Decision to Grant a Patent for an Invention dated May 16, 2022 in Russian Application No. 2021127583, with English translation, 22 pages.
International Search Report for PCT/JP2020/010484, dated May 12, 2020, 4 pages.
Notice of Allowance dated Apr. 27, 2023 in Chinese Application No. 202080020710.4 with English translation of Search Report (6 pages).

* cited by examiner

LEFT ←----→ RIGHT

PAPER SHEET DETECTION DEVICE, PAPER SHEET DETECTION METHOD, AND PAPER SHEET PROCESSING DEVICE

TECHNICAL FIELD

The present invention relates to a paper sheet detection device, a paper sheet detection method, and a paper sheet processing device.

This application is the U.S. national phase of International Application No. PCT/JP2020/010484 filed Mar. 11, 2020 which designated the U.S. and claims priority to Japanese Patent Application No. 2019-047278, filed Mar. 14, 2019, the contents of each which are incorporated herein by reference.

BACKGROUND ART

In recent years, in some countries, banknotes made of synthetic resin polymer materials (hereinafter referred to as polymer banknotes) have been used for the purpose of improving durability and security. Some polymer banknotes of this type have on a surface a non-transparent region where printing and the like is performed and a transparent region where printing is not performed, with anti-counterfeiting measures being applied to the transparent region.

Conventionally, as a paper sheet detection device, in order to detect such a polymer banknote, a light transmission type optical sensor having a light-emitting portion that emits light and a light-receiving portion that receives light emitted from the light-emitting portion has been used. In this optical sensor, when there is no polymer banknote between the light-emitting portion and the light-receiving portion, the light emitted from the light-emitting portion is not blocked by the polymer banknote, and so nearly all of the emitted light is received by the light-receiving portion. On the other hand, when a polymer banknote is present between the light-emitting portion and the light-receiving portion, the light emitted from the light-emitting portion is blocked by the non-transparent region of the polymer banknote, and so the emitted light is not received by the light-receiving portion. In this way, the paper sheet detection device detects the presence or absence of polymer banknotes on the basis of the light-receiving level of the light received by the light-receiving portion of the optical sensor (see Patent Document 1).

PRIOR ART DOCUMENTS

Patent Documents

[Patent Document 1] Japanese Unexamined Patent Application, First Publication No. 2018-036874

SUMMARY OF INVENTION

Problem to be Solved by the Invention

However, in the conventional paper sheet detection device, when the transparent region of the polymer banknote is located on the optical path of the light emitted from the light-emitting portion of the optical sensor, most of the light emitted from the light-emitting portion passes through the transparent region, and so the light-receiving level of the light in the light-receiving portion becomes high. As a result, the paper sheet detection device may make an erroneous determination that the polymer banknote does not exist even though the polymer banknote exists between the light-emitting portion and the light-receiving portion, and so it may not be possible to properly detect the presence or absence of polymer banknotes. Such a problem can also occur when a light-reflecting optical sensor is used. Such a problem may occur not only with polymer banknotes but also other paper sheets as long as the paper sheets have different light transmission states and reflection states depending on the location.

Accordingly, an object of the present invention is to provide a paper sheet detection device, a paper sheet detection method, and a paper sheet processing device capable of satisfactorily detecting the presence or absence of paper sheets.

Means for Solving the Problem

A first aspect according to the present invention is a paper sheet detection device including: an optical sensor that includes a light-emitting portion that emits light, and a light-receiving portion that receives the emitted light; a storage portion that stores a first threshold value used for determining whether or not a paper sheet is present in a path of the emitted light, a target light-receiving level set as a target value of a level of the light received by the light-receiving portion in a state where the paper sheet is not present, and a second threshold value that is set to a value that is greater than the first threshold value and less than the target light-receiving level; an estimating portion that determines whether the level of the light received by the light-receiving portion is equal to or greater than the first threshold value and less than the second threshold value, and that estimates whether or not the paper sheet is present; and a light amount adjusting portion that adjusts an amount of the light emitted by the light-emitting portion so that the level of the light received by the light-receiving portion becomes the target light-receiving level in the state where the paper sheet is not present when the estimating portion estimates that the paper sheet is not present after the estimating portion determines that the level of the light received by the light-receiving portion is equal to or greater than the first threshold value and less than the second threshold value.

A second aspect according to the present invention is a paper sheet processing device including: the above paper sheet detection device; a receiving portion that receives charging of the paper sheet; a stacking portion that is provided with the paper sheet detection device and that stores the paper sheet; an identifying and counting portion that identifies and counts the paper sheet; and a sorting portion that sorts the paper sheet that have been identified and counted by the identifying and counting portion to the stacking portion.

A third aspect according to the present invention is a paper sheet detection method including: emitting light by a light-emitting portion; receiving the emitted light by a light-receiving portion; determining whether a level of the light received by the light-receiving portion is equal to or greater than a first threshold value and less than a second threshold value, the first threshold value being used for determining whether or not a paper sheet is present in a path of the emitted light, the second threshold value being set to a value less than a target light-receiving level set as a target value of the level of the light received by the light-receiving portion in a state where the paper sheet is not present; estimating whether or not the paper sheet is present; and adjusting an amount of the light emitted by the light-emitting portion so that the level of the light received by the light-receiving portion becomes the target light-receiving level in the state where the paper sheet is not present when it is estimated that the paper sheet is not present after it is determined that the level of the light received by the light-receiving portion is equal to or greater than the first threshold value and less than the second threshold value.

Effect of the Invention

According to the present invention, it is possible to provide a paper sheet detection device, a paper sheet detection method, and a paper sheet processing device capable of satisfactorily detecting the presence/absence of paper sheets.

Figure 7:
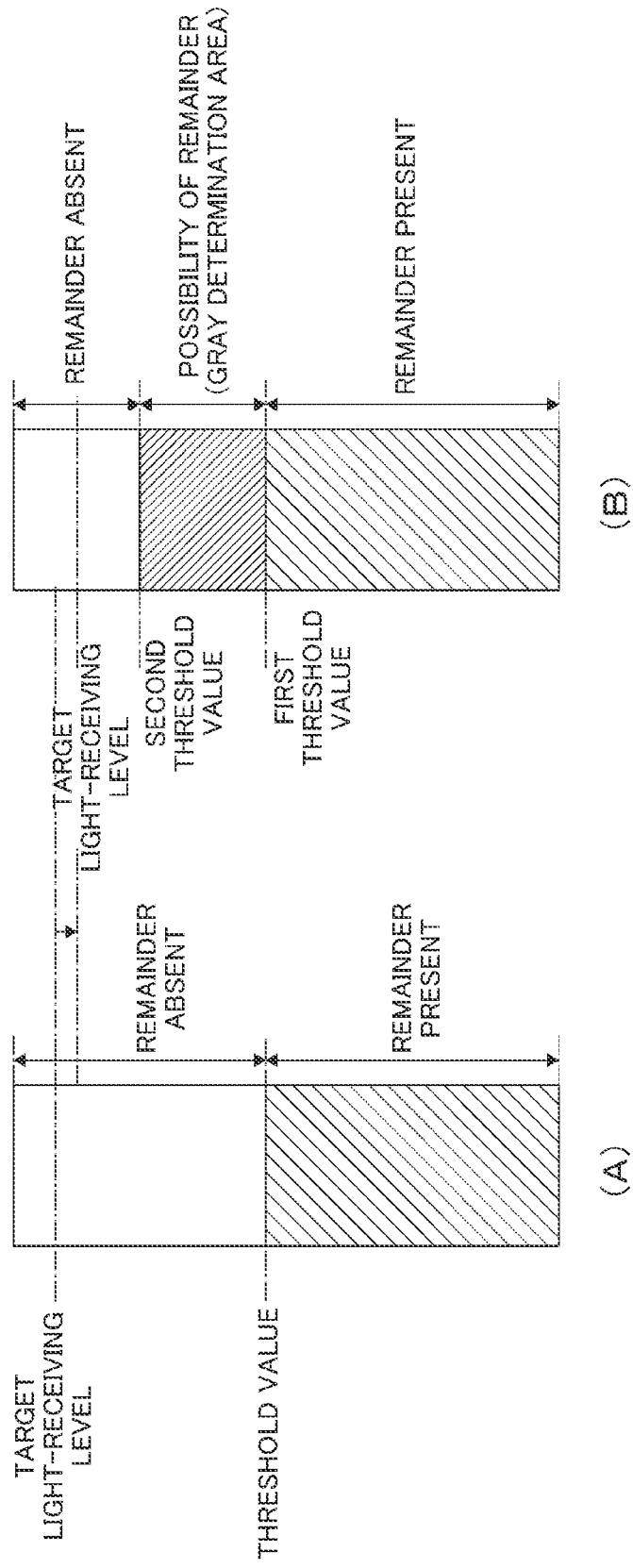

Part (A) of FIG. 7 is a diagram illustrating a method of setting a threshold value in the paper sheet detection device according to a related technique, and part (B) of FIG. 7 is a diagram illustrating a method of setting a threshold value in the paper sheet detection device according to the embodiment.

Figure 8:
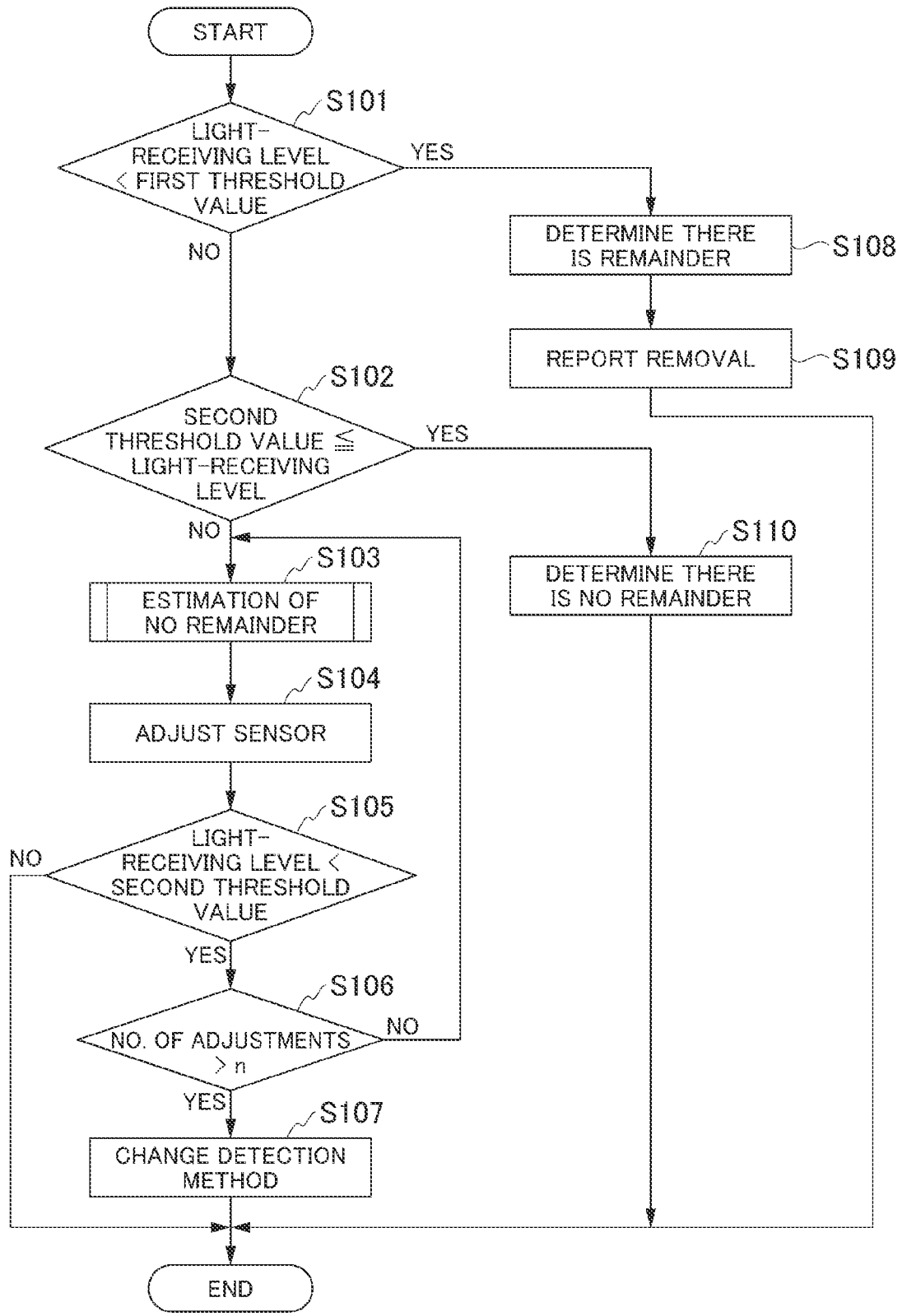

FIG. 8 is a flowchart illustrating a paper sheet detection method according to the embodiment.

Figure 9:
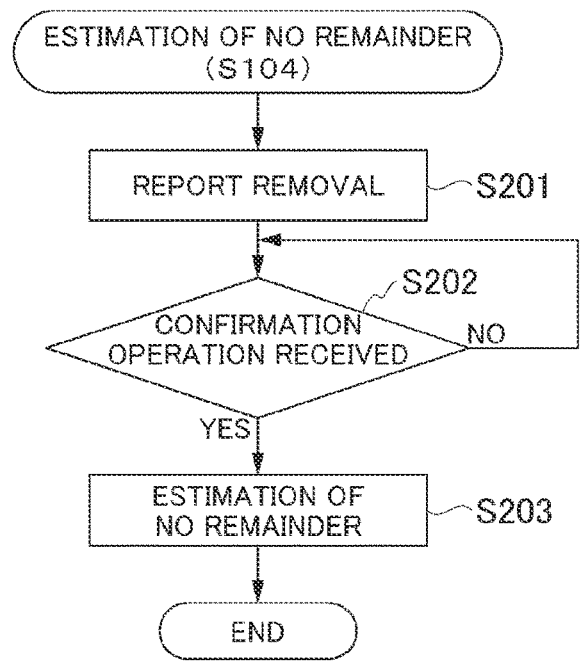

FIG. 9 is a flowchart illustrating a method of estimating the remainder of paper sheets in the paper sheet detection method according to the embodiment.

Figure 10:
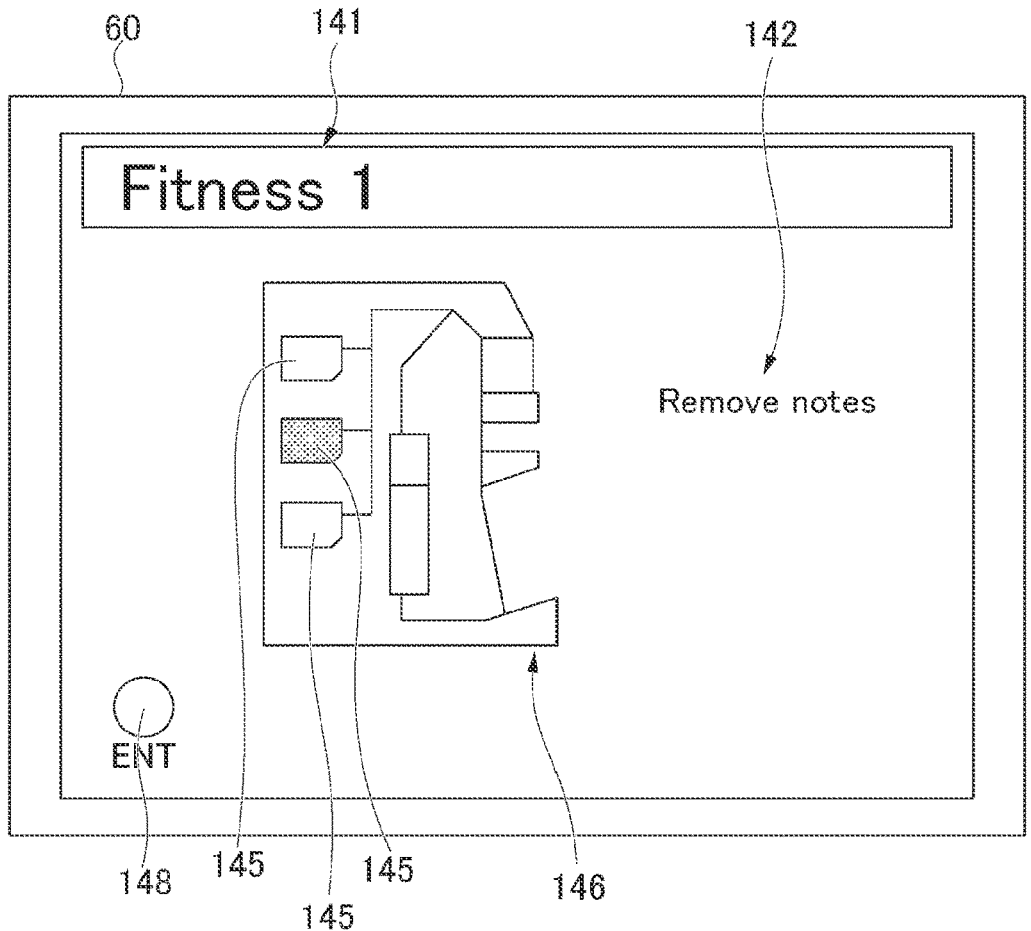

FIG. 10 is a diagram illustrating an example of reporting by an operation display portion of the paper sheet detection device according to the embodiment.

Figure 11:
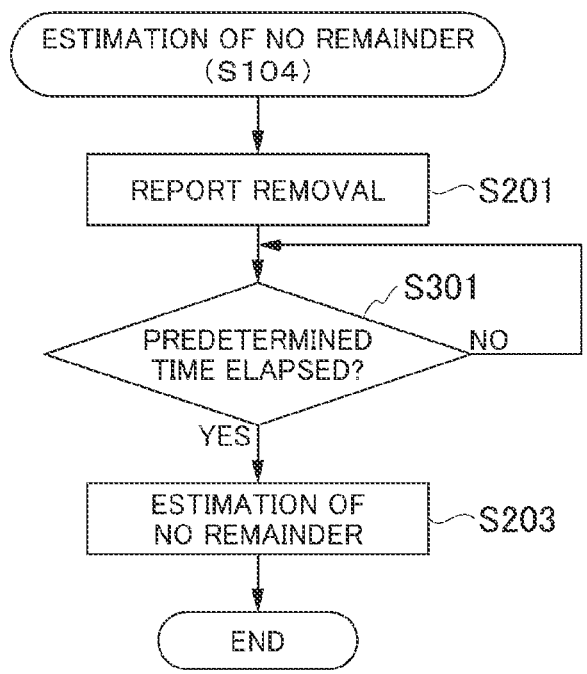

FIG. 11 is a flowchart illustrating a modified example of a method for estimating the remainder of paper sheets in the paper sheet detection method according to the embodiment.

Figure 12:
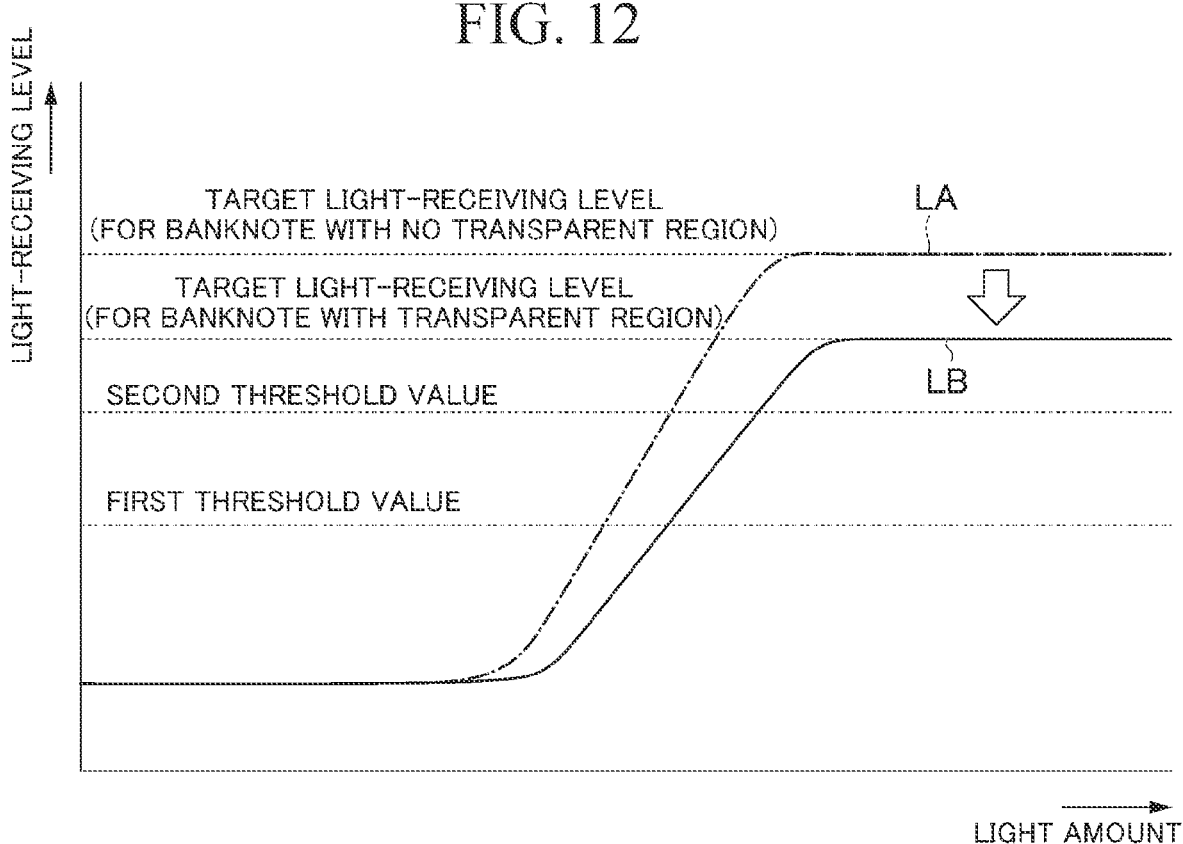

FIG. 12 is a characteristic diagram showing the light-receiving level of light at the light-receiving portion with respect to the amount of light.

EMBODIMENTS FOR CARRYING OUT THE INVENTION

Embodiment

Figure 1:
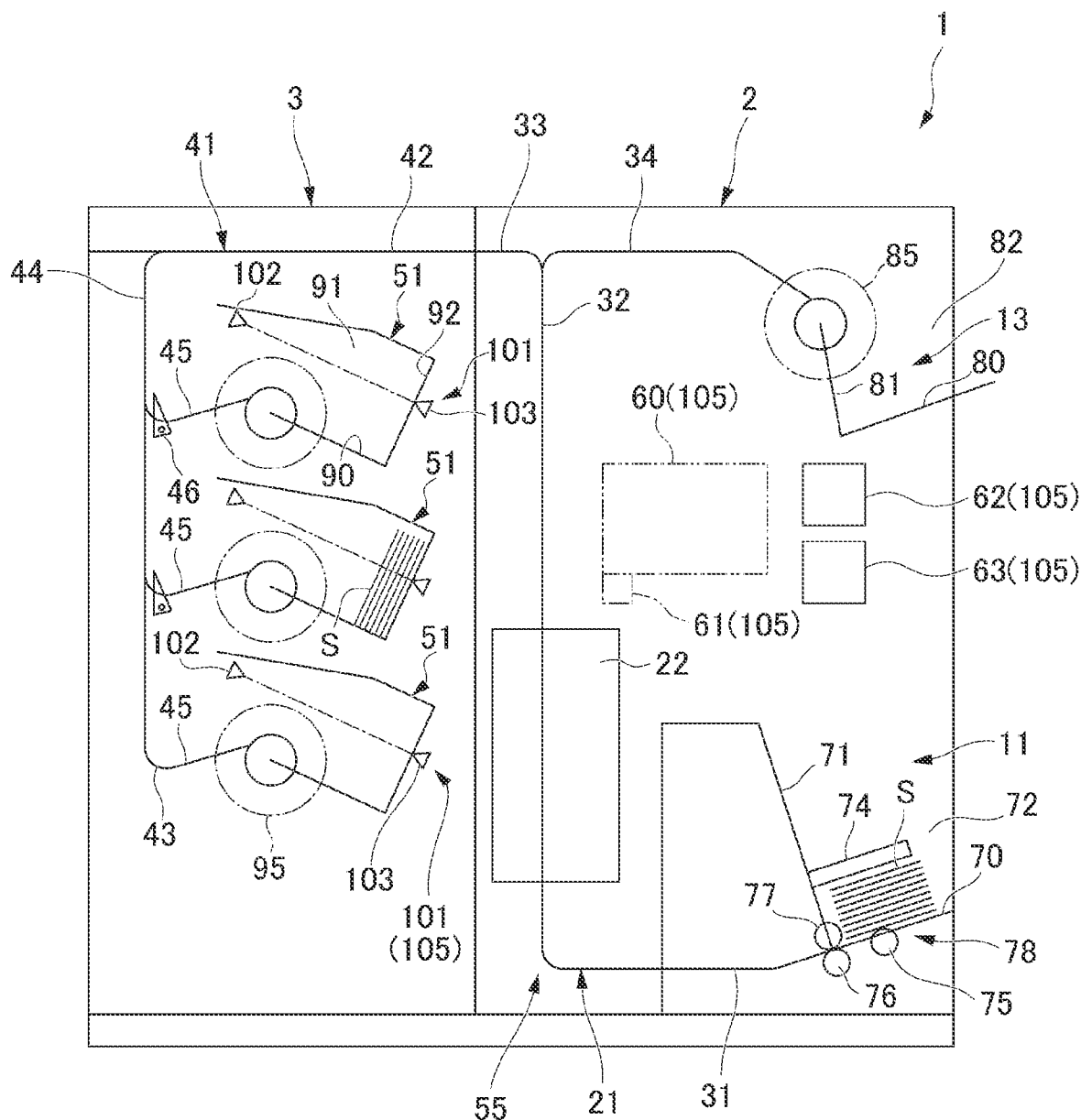
FIG. 1 is a schematic configuration diagram, viewed from the front side, of the interior of a paper sheet processing device including a paper sheet detection device according to an embodiment.

The paper sheet detection device, the paper sheet detection method, and the paper sheet processing device according to the embodiment will be described below with reference to the drawings. FIG. 1 shows a paper sheet processing device 1 according to the embodiment. The paper sheet processing device 1 performs a process of classifying paper sheets such as banknotes, securities, and coupons as paper sheets. Here, a case where a process of classifying banknotes as paper sheets is performed will be described as an example.

<Hardware Configuration of Paper Sheet Processing Device 1>

First, the hardware configuration of the paper sheet processing device 1 will be described.

The paper sheet processing device 1 according to the embodiment shown in FIG. 1 classifies charged banknotes S as counting target banknotes that are counting targets and rejected banknotes that are not counting targets, and further counts the counting target banknotes by type and accommodates the counting target banknotes by type. The paper sheet processing device 1 displays the counting result in association with the accommodation destination. In the following description, "front" is the operator side, "rear" is the side opposite to the operator, "right" is the right side when viewed from the operator, and "left" is the left side when viewed from the operator.

The paper sheet processing device 1 is configured by combining a counting unit 2 and a stacking unit 3. The counting unit 2 identifies and counts banknotes S. The stacking unit 3 classifies, stacks, and accommodates the banknotes S identified and counted by the counting unit 2 and conveyed from the counting unit 2. The stacking unit 3 can perform processing such as stacking a predetermined number of banknotes S sorted according to denomination.

In the paper sheet processing device 1, one or a plurality of desired stacking units 3 can be connected to one counting unit 2. Further, with respect to one counting unit 2, it is also possible to connect the stacking unit 3 and a binding unit that binds a predetermined number of banknotes by wrapping a strap around the banknotes. Here, a case where one stacking unit 3 is connected to one counting unit 2 will be described as an example.

The counting unit 2 has a receiving portion 11 and a reject portion 13. The receiving portion 11 is provided in the lower part of the right side surface side of the counting unit 2, being always open to the outside of the counting unit 2, that is, the outside of the paper sheet processing device 1, across the right side surface and the front surface, although not shown. The reject portion 13 is provided in the upper part of the right side surface side like the receiving portion 11, being always open to the outside of the counting unit 2, that is, the outside of the paper sheet processing device 1, across the right side surface and the front surface. The reject portion 13 and the receiving portion 11 are arranged vertically side by side so as to be aligned in the front-rear direction and the left-right direction.

The receiving portion 11 receives banknotes S charged from outside of the paper sheet processing device 1. In the receiving portion 11, a plurality of banknotes S are set in a state of being stacked in the vertical direction with the long sides (long side portions) thereof aligned with the front and back, and the short sides (short side portions) thereof aligned with the left and right directions. The receiving portion 11 one by one separates and pays out the banknotes S in the stacked state set in this way from the bottom banknote S, and takes the banknotes S into the paper sheet processing device 1. The banknotes S paid out from the receiving portion 11 move along the extending direction of the short sides thereof.

The counting unit 2 has inside thereof an endo-counting unit conveyance configuration portion 21 that conveys the banknotes S that have been charged into the receiving portion 11 and paid out from the receiving portion 11 and an identifying and counting portion 22 that identifies and counts banknotes S being conveyed by the endo-counting unit conveyance configuration portion 21. The banknotes S conveyed by the endo-counting unit conveyance configuration portion 21 move along the extending direction of the short sides thereof.

The endo-counting unit conveyance configuration portion 21 has a left extension portion 31, an upward extension portion 32, a left extension portion 33, and a branch extension portion 34. The left extension portion 31 extends from the receiving portion 11 toward the left side surface of the counting unit 2. The upward extension portion 32 extends upward from the end near the left side surface of the left extension portion 31. The left extension portion 33 extends from the upper end portion of the upward extension portion 32 toward the left side surface of the counting unit 2 and opens on the left side surface. The branch extension portion 34 branches from above the identifying and counting portion 22 of the upward extension portion 32, extends toward the right side surface of the counting unit 2, and is connected to the reject portion 13. The endo-counting unit conveyance configuration portion 21 is provided with the identifying and counting portion 22 in the upward extension portion 32 along the vertical direction.

Within the stacking unit 3, there is provided an endo-stacking unit conveyance configuration portion 41 that is connected to the left extension portion 33 of the counting unit 2 and conveys the banknotes S paid out from the left extension portion 33. Thereby, the endo-stacking unit conveyance configuration portion 41 is connected to the endo-counting unit conveyance configuration portion 21 of the counting unit 2. The banknotes S conveyed by the endo-stacking unit conveyance configuration portion 41 also move along the extending direction of the short sides thereof.

The endo-stacking unit conveyance configuration portion 41 has a connecting conveyance configuration portion 42 and a branching conveyance configuration portion 43. The connecting conveyance configuration portion 42 opens to the upper part of the right side surface of the stacking unit 3, extends horizontally and linearly toward the left side surface of the stacking unit 3, and opens to the upper part of the left side surface. The branching conveyance configuration portion 43 branches downward from the left-side middle portion of the connecting conveyance configuration portion 42. The connecting conveyance configuration portion 42 conveys the banknotes S conveyed by the counting unit 2 in the horizontal direction and in the direction away from the counting unit 2. The branching conveyance configuration portion 43 branches from the connecting conveyance configuration portion 42 and conveys the banknotes S vertically downward, which is different from the horizontal direction.

The connecting conveyance configuration portion 42 and the branching conveyance configuration portion 43 each have an individual drive motor, and can be driven independently of each other. A case in which a plurality of stacking units 3 are connected to one counting unit 2 shall be described. In this case, the plurality of stacking units 3 are arranged side by side in the left-right direction and connected. In addition, the connecting conveyance configuration portions 42 of the adjacent stacking units 3 are connected to each other. With such a configuration, in the paper sheet processing device 1, the endo-counting unit conveyance configuration portion 21 can convey the banknotes S received by the receiving portion 11 toward the plurality of stacking units 3.

The branching conveyance configuration portion 43 of the stacking unit 3 has a downward extension portion 44 and a plurality, specifically three, lateral extension portions 45. The downward extension portion 44 branches from the left-side middle portion of the connecting conveyance configuration portion 42 and extends vertically downward. The plurality of lateral extension portions 45 include one lateral extension portion 45 that extends from the lower end position of the downward extension portion 44 toward the right side surface of the stacking unit 3, and a plurality of lateral extension portions 45 that branch from an intermediate position of the downward extension portion 44 and extend toward the right side surface of the stacking unit 3. At each of the branch positions of the lateral extension portions 45 that branch off from an intermediate position of the downward extension portion 44 is provided a sorting portion 46 that sorts the banknotes S to the downward extension portion 44 and the lateral extension portion 45. These sorting portions 46 make it possible to sort the banknotes S to any of the three lateral extension portions 45.

A stacking portion 51 for stacking and accommodating the banknotes S is connected to each of the three lateral extension portions 45. In FIG. 1, as an example, one stacking unit 3 is provided with three stacking portions 51. For example, one stacking unit 3 may be provided with four stacking portions 51. Two stacking portions 51 may be provided in one stacking unit 3. One stacking portion 51 may be provided in one stacking unit 3. Further, when connecting a plurality of stacking units 3 to the counting unit 2, the number of stacking portions 51 provided in each of the plurality of stacking units 3 can be arbitrarily selected.

Each stacking portion 51 accommodates the banknotes S identified as an accommodation target among the banknotes S identified and counted by the identifying and counting portion 22. For example, when the stacking unit 3 performs a process of stacking a predetermined number of banknotes S sorted for each denomination, a denomination is set for each of the stacking portions 51. Each stacking portion 51 accommodates banknotes S of a target denomination that has been set. The sorting portion 46 sorts the banknotes S to any of the stacking portions 51 so that the set target denomination is accommodated in the stacking portion 51. That is, the paper sheet processing device 1 causes the banknotes S that have been charged into the receiving portion 11 and identified and counted by the identifying and counting portion 22 to be sorted by the sorting portion 46 under predetermined conditions to be stacked in the stacking portions 51.

Each of the stacking portions 51 has an opening portion (not shown) provided on the front surface of the stacking unit 3, that is, the front surface of the paper sheet processing device 1. Each opening portion has a pocket shape that is always open to the outside of the stacking unit 3, that is, the outside of the paper sheet processing device 1.

The plurality of stacking portions 51 provided in one stacking unit 3 are aligned in the front-rear direction and the left-right direction, and are arranged in the vertical direction (height direction) at predetermined intervals. The positions of the plurality of stacking portions 51 are also aligned in the front-rear direction with respect to the receiving portion 11 and the reject portion 13 provided in the counting unit 2.

The endo-counting unit conveyance configuration portion 21 and the endo-stacking unit conveyance configuration portion 41, which are connected to each other, constitute a conveying portion 55 that conveys, within the paper sheet processing device 1, the banknotes S delivered from the receiving portion 11. When a banknote S has been identified by the identifying and counting portion 22 during the conveyance thereof, the portion of the conveying portion 55 downstream of the identifying and counting portion 22 selectively sorts the banknote S to the reject portion 13 and one of the plurality of stacking portions 51 on the basis of the identification result of the identifying and counting portion 22. The counting unit 2 is arranged on the upstream side in the conveying direction of the banknote S by the conveying portion 55, and the stacking unit 3 is arranged on the downstream side.

In the paper sheet processing device 1, the reject portion 13 and the plurality of stacking portions 51 classify the banknotes S on the basis of the identification result of the identifying and counting portion 22 to be accommodated in a removable manner to outside the paper sheet processing device 1. The plurality of stacking portions 51 are configured so that the banknotes S can be pulled out from the opening portion (not shown) provided in the front surface of the paper sheet processing device 1 to the front of the paper sheet processing device 1.

Among the banknotes S taken into the paper sheet processing device 1 by the receiving portion 11, the reject portion 13 stacks the banknotes S that have been identified as rejected banknotes other than the banknotes to be counted by the identifying and counting portion 22, and accommodates the banknotes S to be removable to outside the paper sheet processing device 1. The reject portion 13 stacks the banknotes S fed from the endo-counting unit conveyance configuration portion 21 from the bottom to the top in the payout order. When the banknotes S are paid out from the branch extension portion 34 of the endo-counting unit conveyance configuration portion 21 to the reject portion 13, the long sides thereof are aligned in the front-rear direction and the short sides are aligned in the left-right direction in the reject portion 13.

Among the banknotes S taken into the paper sheet processing device 1 by the receiving portion 11, the plurality of stacking portions 51 stack by type the banknotes S that have been identified by the identifying and counting portion 22 as banknotes to be counted and counted by type and accommodates the banknotes S to be removable to outside the paper sheet processing device 1. Each of the plurality of stacking portions 51 stacks the banknotes S paid out from the endo-stacking unit conveyance configuration portion 41 in the direction from the lower right to the upper left in the payout order.

An operation display portion 60 (reporting portion, operation portion) and an audio output portion 61 (reporting portion) are provided on the front surface of the counting unit 2 of the paper sheet processing device 1. The operation display portion 60 receives operation inputs and displays information on a screen. The audio output portion 61 outputs audio. The operation display portion 60 is a device that displays the operation screen of the paper sheet processing device 1 and the stacking state of banknotes S in the stacking unit 3. In the present embodiment, the operation display portion 60 includes a touch panel on which the operator can perform touch operations. That is, the operator can perform various operations on the paper sheet processing device 1 by touching operation buttons displayed on the operation display portion 60.

Inside the counting unit 2 is provided a control portion 62 that controls the counting unit 2 and each part of the stacking unit 3 connected to the counting unit 2, and a storage portion 63 that stores a plurality of threshold values described below (first threshold value, second threshold value, target light-receiving level), a control program, various parameters, and the like. The control portion 62 controls the entire paper sheet processing device 1.

As described above, the receiving portion 11 provided in the counting unit 2 is provided on the right side surface side of the paper sheet processing device 1 so as to always open to the right side and to the front. The receiving portion 11 has a bottom portion 70, a wall portion 71, and a wall portion 72. The bottom portion 70 is arranged so as to be slightly inclined to the left with respect to the horizontal. The wall portion 71 extends upward from the left end position of the bottom portion 70 so as to be perpendicular to the bottom portion 70. The wall portion 72 extends vertically upward from the trailing edge of the bottom portion 70. The bottom portion 70 and the wall portion 71 extend in the front-rear direction. The wall portion 72 extends in the vertical direction and the left-right direction. The bottom portion 70, the wall portion 71, and the wall portion 72 are arranged perpendicular to each other. The banknotes S are set in the receiving portion 11 in a stacked state on the bottom portion 70 so that one long side is brought into contact with the wall portion 71 and one short side is brought into contact with the wall portion 72. The receiving portion 11 has a bill press 74 that is provided above the bottom portion 70 and that moves up and down along the wall portion 71. The bill press 74 presses the banknotes S placed on the bottom portion 70 toward the bottom portion 70.

The receiving portion 11 has a kick-out roller 75, a take-in roller 76, and a separation roller 77. The kick-out roller 75 kicks out the lowest banknote S among the banknotes S set on the bottom portion 70 toward the endo-counting unit conveyance configuration portion 21 on the left. The take-in roller 76 takes the banknotes S kicked out by the kick-out roller 75 into the paper sheet processing device 1 to deliver the banknotes S to the endo-counting unit conveyance configuration portion 21. The separation roller 77 separates the banknotes S taken in by the take-in roller 76 one by one. The kick-out roller 75, the take-in roller 76, and the separation roller 77 constitute a take-in portion 78 that separates the banknotes S set in the receiving portion 11 one by one and takes the banknotes S into the paper sheet processing device 1.

The identifying and counting portion 22 detects the image of each banknote S and compares the detected image with a reference data. The identifying and counting portion 22 specifies the type of reference data determined to match the detected image as the type of banknote S. The banknote S whose type has been specified in this way is a banknote S without any identification abnormality. On the other hand, when there is no reference data determined to match the detected image, the identifying and counting portion 22 identifies the banknote S as a banknote S with an identification abnormality.

The reject portion 13 provided in the counting unit 2 has a bottom portion 80, a wall portion 81, and a wall portion 82. The bottom portion 80 is arranged so as to be inclined slightly downward to the left with respect to the horizontal. The wall portion 81 extends upward from the left end position of the bottom portion 80 so as to be substantially perpendicular to the bottom portion 80. The wall portion 82 extends vertically upward from the trailing edge of the bottom portion 80. The bottom portion 80 and the wall portion 81 extend in the front-rear direction. The wall portion 82 extends in the vertical direction and the left-right direction. The bottom portion 80 and the wall portion 82 are arranged perpendicular to each other.

An impeller 85 is provided on the upper part of the wall portion 81. The impeller 85 is provided in the vicinity of the terminal position of the branch extension portion 34 of the endo-counting unit conveyance configuration portion 21, and the banknotes S conveyed by the branch extension portion 34 are fed out and stacked on the bottom portion 80. The impeller 85 is provided with a large number of blades (not shown) at predetermined intervals in the circumferential direction. The impeller 85 rotates together with the banknote S conveyed by the branch extension portion 34 sandwiched between the blades. When this banknote S comes into contact with the wall portion 81 and comes out from between the blades, the impeller 85 pushes this banknote S with the blades toward the bottom portion 80 side, that is, downward.

The plurality of stacking portions 51 provided in the stacking unit 3 all have the same configuration, and include an opening portion (not shown), an accommodation bottom portion 90, an accommodation back wall portion 91, and a support wall portion 92. The opening portion opens to the front surface of the paper sheet processing device 1. The accommodation bottom portion 90 is inclined downward to the right with respect to the horizontal. The accommodation back wall portion 91 extends at the rear side of the accommodation bottom portion 90. The support wall portion 92 extends upward from the right end position of the accommodation bottom portion 90 so as to be perpendicular to the accommodation bottom portion 90. The accommodation bottom portion 90 and the support wall portion 92 extend in the front-rear direction. The accommodation back wall portion 91 extends in the vertical direction and the left-right direction. The accommodation bottom portion 90, the accommodation back wall portion 91, and the support wall portion 92 are arranged perpendicular to each other.

An impeller 95 for paying out the banknotes S in the corresponding stacking portion 51 is provided at the terminal position of each lateral extension portion 45 of the branching transport configuration portion 43. The impeller 95 is provided on the side opposite to the support wall portion 92 of the accommodation bottom portion 90 in the stacking portion 51, that is, on the left side. The impeller 95 has many blades (not shown) provided at predetermined intervals in the circumferential direction, and extending on the same side in the circumferential direction. The impeller 95 rotates so that the portion facing the support wall portion 92 moves from top to bottom. Each blade has a fixed end located on the lower side and a free end located on the upper side in a state of facing the support wall portion 92.

Banknotes S that have been conveyed from the left side to the right side by the downward extension portion 44 and the corresponding one of the three lateral extension portions 45 of the branching conveyance configuration portion 43 are sandwiched between the blades, with the impeller 95 rotating together with the banknotes S. When the banknote S comes into contact with the upper surface of the accommodation bottom portion 90 and comes out from between the blades, the impeller 95 pushes the banknote S toward the support wall portion 92 with the blades. At this time, the banknote S is supported by the accommodation bottom portion 90 in a state where the short sides thereof are aligned with the vertical direction and the long side of the lower end thereof is in contact with the upper surface of the accommodation bottom portion 90, and moves to the support wall portion 92 side guided by this upper surface. As a result, the banknote S comes to be supported by the support wall portion 92 in a state of one surface in the thickness direction overlapping the support wall portion 92. The banknote S to be paid out next is similarly supported by the accommodation bottom portion 90 in a state where the short sides thereof are aligned with the vertical direction and the long side of the lower end thereof is in contact with the top surface of the accommodation bottom portion 90, and moves to the support wall portion 92 side guided by this upper surface. As a result, the banknote S comes to be supported by the support wall portion 92 in a state where the surface on one side in the thickness direction overlaps with the surface on the other side in the thickness direction of the banknote S already supported by the support wall portion 92. In this way, the banknotes S are sequentially stacked in the thickness direction thereof and supported by the support wall portion 92.

Each of the plurality of stacking portions 51 is provided with an optical sensor 101 for detecting the presence/absence of the banknotes S, that is, remaining banknotes S. In other words, the optical sensor 101 is arranged in each stacking portion 51. The optical sensor 101 has a light-emitting portion 102 that emits light, and a light-receiving portion 103 that receives the light emitted from the light-emitting portion 102 and outputs a signal corresponding to the light-receiving level (light reception amount). The light-receiving portion 103 is provided on the axis of the optical axis of the light emitted from the light-emitting portion 102 constituting the same optical sensor 101. The light-receiving portion 103 is provided so as to be able to receive the light emitted from the light-emitting portion 102. In the present embodiment, the output signal output by the light-receiving portion 103 according to the light-receiving level is an analog signal represented by a voltage value or a current value.

In the optical sensor 101, as described above, the light-receiving portion 103 is arranged in front of the radiation direction of the light emitted by the light-emitting portion 102. The light-emitting portion 102 and the light-receiving portion 103 are arranged so that the radiation direction of the light radiated by the light-emitting portion 102, in other words, the direction connecting the light-emitting portion 102 and the light-receiving portion 103, follows the stacking direction of the banknotes S stacked in the stacking portion 51, in other words, the thickness direction of the banknotes S stacked in the stacking portion 51. Here, the light-emitting portion 102 is provided in the vicinity of the impeller 95, and the light-receiving portion 103 is provided in the support wall portion 92. On the contrary, the light-receiving portion 103 may be provided in the vicinity of the impeller 95, and the light-emitting portion 102 may be provided in the support wall portion 92. The optical sensor 101 is a light transmission type optical sensor that receives by the light-receiving portion 103 the light radiated by the light-emitting portion 102 and transmitted through the banknotes S. The light-emitting portion 102 radiates light having a predetermined wavelength toward the light-receiving portion 103. In the present embodiment, the light-emitting portion 102 radiates, for example, infrared rays.

The optical sensor 101, together with the operation display portion 60, the audio output portion 61, the control portion 62, and the storage portion 63, constitutes a paper sheet detection device 105 that detects the presence or absence of banknotes S in the stacking portion 51.

Figure 2:
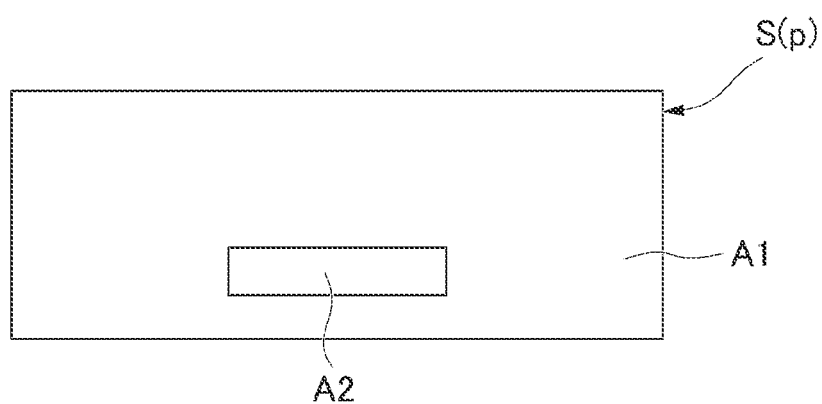
FIG. 2 is a front view schematically showing a polymer banknote detected by the paper sheet detection device according to the embodiment.

The banknotes S to be detected in the presence detection performed by the paper sheet detection device 105 include a so-called polymer banknote S(p) as schematically shown in FIG. 2. The polymer banknote S(p) is formed of a synthetic resin material and has a non-transparent region A1 and a transparent region A2 in which a hologram or the like is provided as an anti-counterfeiting measure. The paper sheet detection device 105 is suitable for detecting the presence of such a polymer banknote S(p). The polymer banknote S(p) is provided with the transparent region A2 in a range surrounded by the non-transparent region A1, in other words, a range of a part of the inside of the non-transparent region A1. For example, a British pound banknote can be mentioned as such a polymer banknote S(p).

Figure 3:
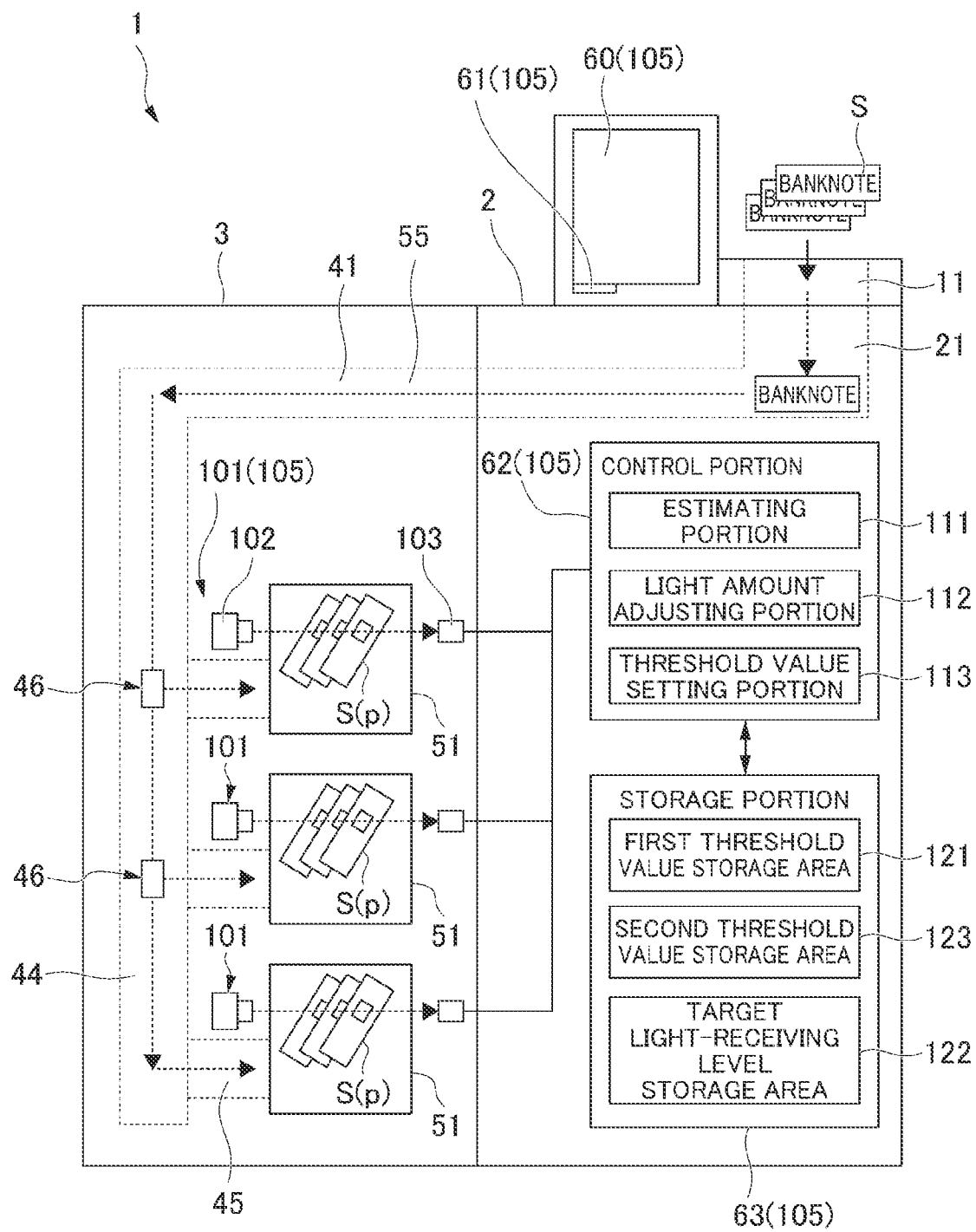
FIG. 3 is a schematic configuration diagram of the paper sheet processing device including the paper sheet detection device according to the embodiment.

As shown in FIG. 3, the control portion 62 includes an estimating portion 111, a light amount adjusting portion 112, and a threshold value setting portion 113. The estimating portion 111 estimates the presence (remaining) of polymer banknotes S(p) in the stacking portion 51 of the stacking unit 3. The light amount adjusting portion 112 adjusts the amount of light emitted by the light-emitting portion 102 of the optical sensor 101. The threshold value setting portion 113 sets various threshold values.

The estimating portion 111 estimates whether or not the polymer banknotes S(p) remain in each stacking portion 51. After information indicating the possibility that the polymer banknotes S(p) exist is reported by the operation display portion 60 and the audio output portion 61, the estimating portion 111 estimates that there are no polymer banknotes S(p) when a confirmation operation for that report has been input to the operation display portion 60.

The estimating portion 111 estimates that there are no polymer banknotes S(p) when the confirmation operation has been input to the operation display portion 60. First, the operation display portion 60 and the audio output portion 61 report information indicating that the polymer banknote S(p) may exist in the stacking portion 51. After that, the operation display portion 60 receives from the operator an input of a confirmation operation for the report. In this case, it is highly possible that the polymer banknote S(p) was taken out from the stacking portion 51 by the operator. Therefore, the estimating portion 111 estimates that there is no polymer banknote S(p) in the stacking portion 51.

The estimating portion 111 may estimate whether or not there is a polymer banknote S(p) in the stacking portion 51 from the detection result of the optical sensor 101. In that case, the estimating portion 111 estimates a change in the presence of the polymer banknote S(p) on the basis of, for example, a first light-receiving level in the light-receiving portion 103 at a first time and a second light-receiving level in the light-receiving portion 103 at a second time after the first time. Here, a change in the presence of the polymer banknote S(p) includes both a change from the state of there being no polymer banknote S(p) to a state of there being a polymer banknote S(p) and a change from the state of there being a polymer banknote S(p) to the state of there being no polymer banknote S(p). Further, a change in the presence of the polymer banknote S(p) means both that there is a change from the state of there being no polymer banknote S(p) to the state of there being a polymer banknote S(p), and that there is a change from the state of there being a polymer banknote S(p) to a state of there not being a polymer banknote S(p).

Figure 4:
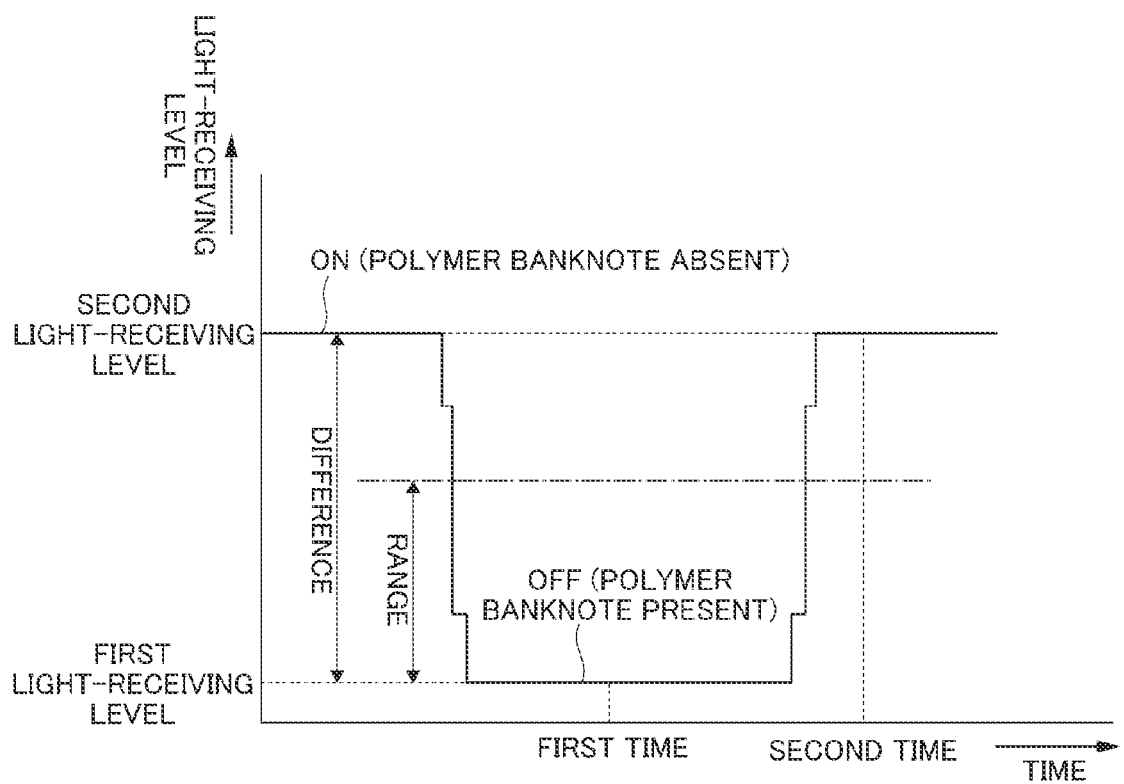
FIG. 4 is a schematic diagram illustrating an example of a light-receiving level of light received by a light-receiving portion of the paper sheet detection device according to the embodiment.

That is, as shown in FIG. 4, the estimating portion 111 calculates the difference between a first light-receiving level at the light-receiving portion 103 at the first time and a second light-receiving level at the light-receiving portion 103 at the second time after the first time. When the difference between the first light-receiving level and the second light-receiving level is less than a predetermined range, the estimating portion 111 determines that there is no change in the presence of the polymer banknote S(p) in the stacking portion 51 provided with the optical sensor 101. When the difference between the first light-receiving level and the second light-receiving level is equal to or greater than a predetermined range, the estimating portion 111 determines that there is a change in the presence of the polymer banknote S(p) in the stacking portion 51 provided with the optical sensor 101. Here, at the first time and the second time, the light-emitting portion 102 of the optical sensor 101 emits light in a constant light emitting state. Therefore, the difference between the first light-receiving level and the second light-receiving level in the light-receiving portion 103 is not affected by the light emitting state of the light-emitting portion 102.

In the example of FIG. 4, the first light-receiving level in the light-receiving portion 103 at the first time is a value corresponding to the OFF state (a state in which a polymer banknote S(p) exists or may exist in the stacking portion 51). Further, the second light-receiving level at the second time is a value corresponding to the ON state (the state in which a polymer banknote S(p) does not exist in the stacking portion 51). In this way, when the first light-receiving level is a value corresponding to the OFF state and the second light-receiving level is a value corresponding to the ON state, the difference between the first light-receiving level and the second light-receiving level is equal to or greater than a predetermined range. Thereby, the estimating portion 111 estimates that there has been a change from the state in which the polymer banknote S(p) exists in the stacking portion 51 to the state in which the polymer banknote S(p) does not exist in the stacking portion 51. As a result, the estimating portion 111 estimates that the polymer banknote S(p) is not present in the stacking portion 51.

When it is estimated by the estimating portion 111 that there is no polymer banknote S(p) in the stacking portion 51, a light amount adjusting portion 112 shown in FIG. 3 adjusts the light amount of the light emitted from the light-emitting portion 102 provided in this stacking portion 51 so that the light-receiving level at the light-receiving portion 103 provided in this stacking portion 51 reaches a predetermined target light-receiving level.

That is, when it is estimated by the estimating portion 111 that polymer banknotes S(p) do not remain in the stacking portion 51, the light amount adjusting portion 112 adjusts the light amount of the light emitted from the light-emitting portion 102 provided in this stacking portion 51 so that the light-receiving level in the light-receiving portion 103 provided in the stacking portion 51 at the current time becomes a predetermined target light-receiving level.

The storage portion 63 stores a plurality of threshold values for detecting the polymer banknote S(p) and a predetermined target light-receiving level. In the present embodiment, the storage portion 63 has a first threshold value storage area 121, a target light-receiving level storage area 122, and a second threshold value storage area 123. The first threshold value storage area 121 stores the first threshold value for detecting the non-transparent region A1 of the polymer banknote S(p). The target light-receiving level storage area 122 stores the target light-receiving level set as the target value of the light-receiving level at the light-receiving portion 103 when the polymer banknote S(p) does not exist in the stacking portion 51. The second threshold value storage area 123 stores the second threshold value set to a value equal to or greater than the first threshold value and lower than the target light-receiving level. The first threshold value is a threshold value used for determining whether or not banknotes S including the polymer banknote S(p) are present in the stacking portion 51, and is set to a value at which the non-transparent region A1 of the polymer banknote S(p) can be detected. The second threshold value is a threshold value used for determining whether or not there is the polymer banknote S(p) in the stacking portion 51, and is set to a value at which the transparent region A2 of the polymer banknote S(p) can be detected.

In the present embodiment, the first threshold value and the second threshold value are preset by the threshold value setting portion 113 of the control portion 62 at the time of shipment from the factory on the basis of actual machine data experiments performed in advance. Further, the target light-receiving level is preset by gradually increasing the amount of light emitted from the light-emitting portion 102 until the light-receiving level of the light received by the light-receiving portion 103 reaches a predetermined target value, in a state where there are no banknotes S in the stacking portion 51.

<Hardware Configuration of Paper Sheet Detection Device 105>

Next, the hardware configuration of the paper sheet detection device 105 and the method of detecting a polymer banknote S(p) by the paper sheet detection device 105 will be described.

Figure 5:
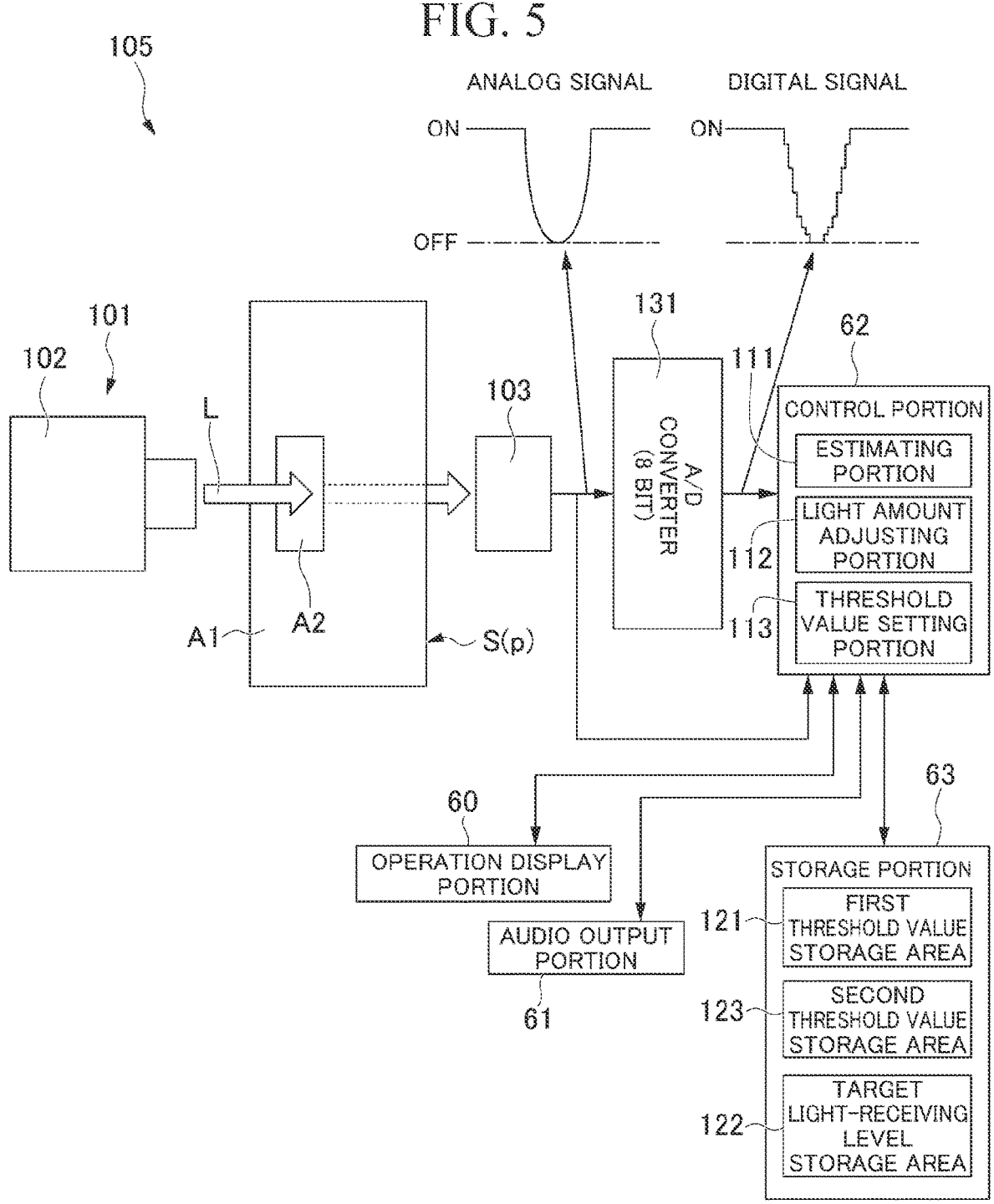
FIG. 5 is a configuration diagram of the paper sheet detection device according to the embodiment, schematically showing a state of light when detecting a transparent region of a polymer banknote.

As shown in FIG. 5, the paper sheet detection device 105 includes an A/D converter 131 in addition to the operation display portion 60, the audio output portion 61, the control portion 62, the storage portion 63, and the optical sensor 101 described above. The A/D converter 131 converts the output signal (analog signal) of the light-receiving portion 103 of the optical sensor 101 into a digital signal and outputs the digital signal to the control portion 62.

In the paper sheet detection device 105, when the light-receiving portion 103 receives the light emitted from the light-emitting portion 102 of the optical sensor 101, the light-receiving portion 103 outputs an output signal (analog signal) according to the light-receiving level of the light. The analog signal output from the light-receiving portion 103 is input to the A/D converter 131 and thereby converted into a digital signal. In the present embodiment, the A/D converter 131 is an 8-bit converter, and converts an analog signal output from the light-receiving portion 103 into a digital signal with a resolution of 256 steps according to the magnitude of the analog signal. The digital signal output from the A/D converter 131 is input to the control portion 62. In addition to the digital signal after A/D conversion, the analog signal output from the light-receiving portion 103 is also input to the control portion 62 as is.

A case where there is a polymer banknote S(p) in the stacking portion 51 of the stacking unit 3, and the transparent region A2 of the polymer banknote S(p) is located on the optical path of the light L emitted from the light-emitting portion 102 will be described. In this case, as schematically shown in FIG. 5, most of the light L emitted from the light-emitting portion 102 passes through the transparent region A2 and is received by the light-receiving portion 103. A part of the light L emitted from the light-emitting portion 102 is absorbed or reflected in the transparent region A2 and so is not received by the light-receiving portion 103. For this reason, the light-receiving level of the light L received by the light-receiving portion 103 is lower than the case of there being no polymer banknote S(p) in the stacking portion 51.

Figure 6:
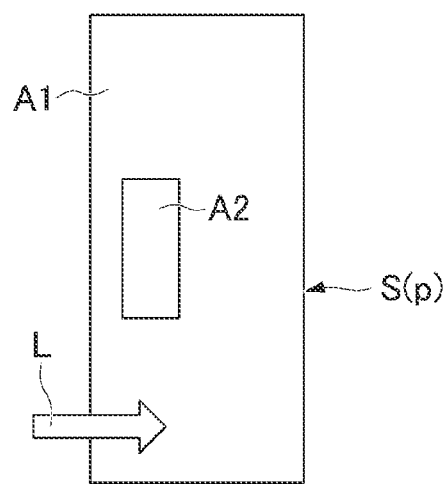
FIG. 6 is a front view schematically showing the state of light when a non-transparent region of a polymer banknote is detected by the paper sheet detection device according to the embodiment.

Next will be described a case where there is a polymer banknote S(p) in the stacking portion 51 of the stacking unit 3 and, as shown schematically in FIG. 6, the non-transparent region A1 of the polymer banknote S(p) in the stacking portion 51 is positioned on the optical path of the light L emitted from the light-emitting portion 102. In this case, the light L emitted from the light-emitting portion 102 is blocked by the non-transparent region A1 of the polymer banknote S(p) and hardly received by the light-receiving portion 103.

When there is no polymer banknote S(p) in the stacking portion 51, there is nothing to block the light L emitted from the light-emitting portion 102. Therefore, the light L is received by the light-receiving portion 103 in nearly the state at the time of emission.

The control portion 62 shown in FIG. 5 determines the presence of the polymer banknote S(p) in the stacking portion 51 of the stacking unit 3 on the basis of the output signal from the light-receiving portion 103 after A/D conversion and a predetermined threshold value stored in the storage portion 63. Since the output signal (including the digital signal after A/D conversion) output from the light-receiving portion 103 is output according to the light-receiving level of the light received by the light-receiving portion 103, unless otherwise specified, it is described as the light-receiving level.

<Threshold Value Setting Method>

Next, the method of setting the threshold value for detecting the polymer banknote S(p) by the control portion 62 will be described while making a comparison with a threshold value setting method according to a related technique.

Part (A) of FIG. 7 is a diagram illustrating a method of setting a threshold value in a paper sheet detection device according to the related technique. Part (B) of FIG. 7 is a diagram illustrating a method of setting a threshold value in the paper sheet detection device 105 according to the present embodiment.

As shown in part (A) of FIG. 7, in the paper sheet detection device according to the related technique, the threshold value is set at a light-receiving level capable of detecting the non-transparent region of the banknote S including the polymer banknote S(p). Then, when the light-receiving level of the light received by the light-receiving portion is less than this threshold value, it is determined that banknotes S including the polymer banknote S(p) exist in the stacking unit (that is, remain). On the other hand, when the light-receiving level of the light received by the light-receiving portion is equal to or greater than this threshold value, it is determined that the banknotes S including the polymer banknote S(p) do not exist in the stacking portion (that is, do not remain).

As described above, the paper sheet detection device according to the related technique detects the presence of the banknote S in the stacking portion of the stacking unit by setting one threshold value based on the light-receiving level of light in the light-receiving portion when the light emitted from the light-emitting portion is blocked by the non-transparent region of the banknote S.

However, as described above, there are times when a plurality of polymer banknotes S(p) are stacked in the stacking portion 51 in a state where the transparent region A2 is located on the optical path of the light L emitted from the light-emitting portion 102, or when only one polymer banknote S(p) is accommodated in the stacking portion 51 in a state of the transparent region A2 being located on the optical path of the light L. In such a case, most of the light L passes through the transparent region A2 of the polymer banknote S(p) to be received by the light-receiving portion 103. As a result, the light-receiving level of the light L received by the light-receiving portion 103 becomes equal to or greater than the set threshold value, and so there is a risk of an erroneous determination that the polymer banknote S(p) does not exist even though the polymer banknote S(p) exists in the stacking portion 51.

Therefore, in the present embodiment, as shown in part (B) of FIG. 7, the first threshold value, the target light-receiving level (target value), and the second threshold value are set. The first threshold value is a threshold value set based on the light-receiving level of the light L in the light-receiving portion 103 when the light L emitted from the light-emitting portion 102 is blocked by the non-transparent region A1 of the polymer banknote S(p). The target light-receiving level is a light-receiving level preset as a target value of the light-receiving level of the light L at the light-receiving portion 103 when there is no banknote S including the polymer banknote S(p) in the stacking portion 51 (that is, the light-receiving level is a target value of the light-receiving level of the light L at the light-receiving portion 103 when the banknote S including the polymer banknote S(p) does not exist in the stacking portion 51). The second threshold value is a threshold value set to a value equal to or greater than the first threshold value and less than the target light-receiving level (or a value larger than the first threshold value and smaller than the target light-receiving level).

Here, it is preferable that the second threshold value be set so as to be equal to or greater than the first threshold value and in the range of 85% to 95% of the target light-receiving level. That is, by setting the second threshold value to be within this range, the second threshold value becomes equal to or greater than the light-receiving level of the light received by the light-receiving portion 103 when the non-transparent region A1 of the polymer banknote S(p) is present between the light-emitting portion 102 and the light-receiving portion 103, and in a range that is smaller than the target light-receiving level of the light L received by the light-receiving portion 103 when there is no banknote S including the polymer banknote S(p) between the light-emitting portion 102 and the light-receiving portion 103.

By setting the second threshold value in this way, the control portion 62 can appropriately determine that the light-receiving level of the light L in the light-receiving portion 103 is in a gray determination area between the first threshold value and the second threshold value indicating that the polymer banknote S(p) exists or may exist, even when the light L in the transparent region A2 of the polymer banknote S(p) has high transmittance, for example, when there is only one polymer banknote S(p).

<Banknote Detection Method>

Next, a method of detecting the banknote S in the paper sheet detection device 105 will be described.

The above-mentioned first threshold value, second threshold value, and target light-receiving level are set in advance by actual device data experiments for each paper sheet processing device 1 provided with the paper sheet detection device 105, and stored in the storage portion 63 of the paper sheet detection device 105 at the time of shipment from the factory. Then, a reset operation or a counting operation is performed in the paper sheet processing device 1, and after the polymer banknotes S(p) existing in the receiving portion 11 and the conveying portion 55 are stacked in the reject portion 13 and any of all the stacking portions 51 of the stacking unit 3, the following processing is performed.

The control portion 62 controls each of the optical sensors 101 provided in all the stacking portions 51 according to the flowchart shown in FIG. 8.

As shown in FIG. 8, first, in Step S101, the control portion 62 (estimating portion 11, the same applies hereinafter) causes the light-emitting portion 102 of the optical sensor 101 to emit light at a set predetermined output, and determines whether or not the light-receiving level of the light L in the light-receiving portion 103 of this optical sensor 101 is less than the first threshold value (see part (B) in FIG. 7) for detecting the non-transparent region A1 of the polymer banknote S(p).

When the control portion 62 has determined that the light-receiving level of the light L in the light-receiving portion 103 is less than the first threshold value (Step S101: YES), the control portion 62 determines that banknotes S including the polymer banknote S(p) exist, that is, remain, in the stacking portion 51 provided with the light-receiving portion 103 (Step S108). In this case, information instructing the extraction of the banknotes S remaining in the stacking portion 51 is reported by the operation display portion 60 and the audio output portion 61, and the process ends (Step S109). Upon detecting that the banknotes S have been removed from this stacking portion 51 based on the detection result of the optical sensor 101, the control portion 62 stops the reporting by the operation display portion 60 and the audio output portion 61.

Upon determining in Step S101 that the light-receiving level at the light-receiving portion 103 is not less than the first threshold value (Step S101: NO), the control portion 62 proceeds to the process of Step S102.

In Step S102, the control portion 62 determines whether or not the light-receiving level of the light L in the light-receiving portion 103 is equal to or greater than the second threshold value for detecting the transparent region A2 of the polymer banknote S(p) (Step S102). Upon determining that the light-receiving level of the light L in the light-receiving portion 103 is equal to or greater than the second threshold value (Step S102: YES), the control portion 62 determines that there are no polymer banknotes S(p) in stacking portions 51 provided with the light-receiving portion 103, and ends the process (Step S110).

When the control portion 62 determines in Step S102 that the light-receiving level at the light-receiving portion 103 is not equal to or greater than the second threshold value (Step S102: NO), the control portion 62 proceeds to the process of Step S103.

The control portion 62 estimates in Step S103 that the polymer banknote S(p) does not remain in the stacking portion 51 provided with the light-receiving portion 103.

Here, the estimation process by the control portion 62 that the polymer banknotes S(p) do not remain in the stacking portion 51 will be described below.

When the light-receiving level of the light L in the light-receiving portion 103 is equal to or greater than the first threshold value stored in the storage portion 63 (Step S101: NO), and less than the second threshold value stored in the storage portion 63 (Step S102: NO), the control portion 62 determines that the polymer banknote S(b) may remain in the stacking portion 51 provided with the light-receiving portion 103. In this case, as shown in FIG. 9, in Step S201, the operation display portion 60 and the audio output portion 61 perform reporting that instructs the operator to remove the banknotes from the stacking portion 51. In other words, the operation display portion 60 and the audio output portion 61 report information indicating the possibility that the banknotes S may exist when the light-receiving level of the light L at the light-receiving portion 103 is equal to or greater than the first threshold value and lower than the second threshold value.

Then, the estimating portion 111 of the control portion 62 determines in Step S202 whether or not the operation display portion 60 has received from the operator an input operation confirming extraction of the banknote S from the stacking portion 51. Upon determining that the operation display portion 60 has accepted an input operation confirming extraction of the banknote S from this stacking portion 51 (Step S202: YES), the estimating portion 111 determines that the banknotes S have been extracted from this stacking portion 51, and in Step S203 estimates that polymer banknotes S(p) do not remain in the stacking portion 51. On the other hand, upon determining in Step S202 that the operation display portion 60 has not accepted an input operation confirming extraction of the banknotes S from the stacking portion 51 (Step S202: NO), the estimating portion 111 repeats Step S202 and stands by until determining that the operation display portion 60 has accepted the confirmation input operation.

In the present embodiment, the control portion 62 causes the operation display portion 60 to give notice indicating that a polymer banknote S(p) may remain in the stacking portion 51 of the paper sheet processing device 1, while specifying the stacking portion 51 where the polymer banknote S(p) may remain as shown in FIG. 10. In the example of FIG. 10, the operation display portion 60 displays a caution display 141 of "Fitness 1" and an instruction display 142 of "Remove notes" instructing removal of banknotes. In addition to these, it performs display that indicates in which of the stacking portions 51 of the stacking unit 3 the polymer banknote S(p) remains in a visually recognizable manner. That is, an illustration display 146 of the stacking unit 3 including an illustration display 145 of all the stacking portions 51 is displayed. Moreover, among the illustration display 145 of all the stacking portions 51, the illustration display 145 of the stacking portion 51 in which the polymer banknote S(p) remains or may remain (indicated by shading in FIG. 10) is displayed differently to be visually recognizable from the illustration display 145 of the stacking portions 51 in which the polymer banknote S(p) does not remain (displayed in white in FIG. 10).

Further, when control portion 62 displays in the operation display portion 60 a confirmation button 148 of "ENT (ENTER)" and receives a pressing operation of the confirmation button 148 from the operator, the estimating portion 111 determines that the polymer banknote S(p) has been extracted by the operator from this stacking portion 51, and estimates that none remain (Step S203).

In steps S101 and S102 described above, upon determining that the light-receiving level at the light-receiving portion 103 of the optical sensor 101 is equal to or greater than the first threshold value and less than the second threshold value (first threshold value≤light-receiving level<second threshold value), when the estimating portion 111 estimates that the polymer banknote S(p) does not remain in the stacking portion 51 (Step S103), in Step S104, the light amount adjusting portion 112 performs an adjusting process of adjusting the light amount of the light L emitted from the light-emitting portion 102 provided in this stacking portion 51 so that the light-receiving level at the light-receiving portion 103 of the optical sensor 101 provided in this stacking portion 51 becomes a preset target light-receiving level. That is, when the light-receiving level in the light-receiving portion 103 is equal to or greater than the first threshold value and lower than the second threshold value, the light amount adjusting portion 112 adjusts the amount of light emitted from the light-emitting portion 102 so that the light-receiving level at the light-receiving portion 103 becomes the target light-receiving level, when it is estimated by the estimating portion 111 that there is no polymer banknote S(p). The light amount adjusting portion 112 performs adjusting, for example, so as to gradually increase the amount of light emitted from the light-emitting portion 102.

Next, the processing after the control portion 62 adjusts the amount of light L emitted from the light-emitting portion 102 of the optical sensor 101 so that the light-receiving level at the light-receiving portion 103 of the optical sensor 101 becomes the target light-receiving level will be described. After the above adjustment, the control portion 62 determines in Step S105 whether or not the light-receiving level at the light-receiving portion 103 of this optical sensor 101 is less than the second threshold value (Step S105). Upon determining that the light-receiving level at this light-receiving portion 103 is not less than the second threshold value (Step S105: NO), the control portion 62 determines that the optical sensor 101 can appropriately determine that there is no polymer banknote S(p). In this case, the control portion 62 sets the drive state of the light-emitting portion 102 after this adjustment as the drive state of the light-emitting portion 102, updates the information regarding the drive state of the light-emitting portion 102 stored in the storage portion 63 to the adjusted information, and ends the process. Thereby, subsequently, in this optical sensor 101, the amount of light L emitted by the light-emitting portion 102 is set as the amount of light after this adjustment.

On the other hand, when the control portion 62 has determined that the light-receiving level at the light-receiving portion 103 of this optical sensor 101 is less than the second threshold value after the above adjustment, the process proceeds to Step S106.

In Step S106, the control portion 62 determines whether or not the number of executions of the adjustment process for adjusting, by the light amount adjusting portion 112, the amount of light L emitted from the light-emitting portion 102 of the optical sensor 101 so as to reach the target light-receiving level is equal to or greater than a predetermined number of times n (for example, n=3). When the control portion 62 determines that the number of executions is n or more, which is a preset number of times (Step S106: YES), the control portion 62 performs the process of Step S107. On the other hand, when the control portion 62 has determined that the number of executions of the adjustment process for adjusting the amount of light L emitted from the light-emitting portion 102 of the optical sensor 101 so as to reach the target light-receiving level is less than the preset predetermined number of times n (Step S106: NO), there is a possibility that the polymer banknote S(p) has not been taken out from the stacking portion 51 provided with this optical sensor 101. For this reason, the control portion 62 returns to Step S103 and repeats the processes of steps S103 to S105.

In Step S107, the control portion 62 changes the method of detecting the polymer banknote S(p) by the optical sensor 101 to a method using a threshold value according to a related technique (the method shown in part (A) of FIG. 7) and ends the process.

In the above embodiment, in Step S103, the case was illustrated of the estimating portion 111 estimating that no polymer banknotes S(p) remain in the stacking portion 51 on the basis of having received the input operation of the extraction confirmation to the operation display portion 60 by the operator, after extraction of the banknote S has been reported by the operation display portion 60 and the audio output portion 61. However, the method of estimating that there is no remaining polymer banknote S(p) is not limited thereto.

For example, the estimating portion 111 may estimate that there is no polymer banknote S(p) when a certain period of time has elapsed after information indicating the possibility that a polymer banknote S(p) exists is reported by the operation display portion 60 and the audio output portion 61. That is, when a predetermined time elapses after the operation display portion 60 and the audio output portion 61 have reported information indicating that the polymer banknote S(p) may exist in the stacking portion 51, the estimating portion 11 determines that it is highly probable that the polymer banknote S(p) has been extracted from the stacking portion 51 by the operator. For this reason, the estimating portion 111 estimates that there is no polymer banknote S(p) in this stacking portion 51. Specifically, as shown in FIG. 11, when a predetermined period of time has elapsed (Step S301: YES) after extraction reporting of the banknote S by the operation display portion 60 and the audio output portion 61 has been performed (Step S201), the estimating portion 11 may determine that there is a high possibility that the polymer banknote S(p) has been extracted by the operator, and estimate that there is no remaining polymer banknote S(p) in this stacking portion 51 (Step S203).

Further, in the above-described embodiment, the case was described as an example of the light-receiving portion 103 of the optical sensor 101, upon receiving the light L emitted from the light-emitting portion 102, outputting an output signal corresponding to the light-receiving level of the received light L (for example, the ON signal of +5V) and, upon not receiving the light L emitted from the light-emitting portion 102, not outputting an output signal (or outputting an OFF signal of 0V); however, the output example of the light-receiving portion 103 is not limited thereto. For example, the light-receiving portion 103 of the optical sensor 101, upon receiving the light emitted from the light-emitting portion 102, may be configured to not output an output signal (or output an OFF signal of 0V), and upon not receiving the light L emitted from the light-emitting portion 102, may output an output signal corresponding to the light-receiving level of the received light L (for example, the ON signal of +5V).

Further, in the above-described embodiment, the case was described as an example of the output signal output from the light-receiving portion 103 of the optical sensor 101 being converted into a digital signal by the A/D converter 131, but the present invention is not limited thereto. For example, an IC (Integrated Circuit) in which the light-receiving portion 103 of the optical sensor 101 and the A/D converter 131 are contained in the same package may be used. Also, detection of the polymer banknote S(p) may be performed using the analog signal output from the light-receiving portion 103 of the optical sensor 101 and the above-mentioned threshold value.

Further, in the above-described embodiment, the case where the light-emitting portion 102 emits infrared rays has been described as an example, but the light-emitting portion 102 may emit a wavelength other than infrared rays.

Further, in the above-described embodiment, the case of using a light-transmission type optical sensor 101 was described as an example, but the embodiment is not limited thereto. For example, a light-reflecting type optical sensor that receives, by a light-receiving portion, light emitted from a light-emitting portion and reflected from the banknote may be used.

It is preferable that the target light-receiving level described above be set to be changeable by a change operation on the operation display portion 60. For example, it is preferable that the target light-receiving level be changed between a banknote having the transparent region A2 and a banknote not having the transparent region A2. As shown in FIG. 12, the light-receiving level of the light-receiving portion 103 when detecting a banknote having no transparent region is as shown by the curved line LA (dash-dot-dash line in FIG. 12). When the target light-receiving level is set by applying this light-receiving level curve LA to the paper sheet detection device 105 according to the embodiment of the present invention, because the slope of the area (gray determination area) between the first threshold and the second threshold is large, even a slight change in the light-receiving level may lead to a deviation from the gray determination area, and so it is not possible to properly perform the gray determination that a banknote may be present.

Therefore, in the paper sheet detection device 105 according to the present embodiment, when detecting a banknote having the transparent region A2, the target light-receiving level is set by applying the curve LB (solid line in FIG. 12) of the light-receiving level in the light-receiving portion 103 by an operation to the operation display portion 60 to detect a banknote having the transparent region A2. The light-receiving level curve LB according to the present embodiment lowers the target light-receiving level more than the light-receiving level curve LA when there is no transparent region, and accordingly, the slope of the region (gray determination area) between the first threshold value and the second threshold value is reduced. Therefore, even if the light-receiving level changes slightly, there is no deviation from the gray determination area, and so the gray determination that there may be a banknote can be appropriately performed.

Further, in the above-described embodiment, the case of detecting the banknote S as a paper sheet was described as an example, but it can also be applied to the case of detecting paper sheets other than banknotes such as securities and coupons, and in particular is suitable for application to paper sheets having a non-transparent region and a transparent region.

As described above, in the embodiment, the paper sheet detection device 105 that detects the presence of a paper sheet (banknote S) is configured to have the optical sensor 101 having the light-emitting portion 102 that emits light and the light-receiving portion 103 that receives the light emitted from the light-emitting portion 102 and outputs a signal corresponding to the light-receiving level, the storage portion 63 that stores the first threshold value used for determining whether or not the banknote S is present, a target light-receiving level set as a target value of the light-receiving level at the light-receiving portion 103 when the banknote S does not exist, and a second threshold value that is set to a value equal to or greater than the first threshold value and less than the target light-receiving level, the estimating portion 111 that estimates the presence of the banknote S, and a light amount adjusting portion 112 that adjusts the amount of light emitted by the light-emitting portion 102 so that the light-receiving level at the light-receiving portion 103 becomes the target light-receiving level when it is estimated by the estimating portion 11 that the banknote S is absent in the case of the light-receiving level at the light-receiving portion 103 being equal to or greater than the first threshold value and less than the second threshold value.

Conventionally, a paper sheet detection device that detects the presence of a paper sheet by an optical sensor is known. In this paper sheet detection device, the light-receiving level at the light-receiving portion of the light emitted from the light-emitting portion of the optical sensor differs depending on the presence of a paper sheet, with the presence of the paper sheet being detected by measuring the light-receiving level at this light-receiving portion. Specifically, when a paper sheet is present between the light-emitting portion and the light-receiving portion of the optical sensor, the light emitted from the light-emitting portion of the optical sensor is blocked by the paper sheet, and so the light-receiving level at the light-receiving portion is less than a predetermined threshold value. On the other hand, when there is no paper sheet between the light-emitting portion and the light-receiving portion of the optical sensor, the light emitted from the light-emitting portion of the optical sensor is not blocked by the paper sheet, and so the light-receiving level at the light-receiving portion is equal to or greater than the predetermined threshold value. Thereby, the paper sheet detection device can detect the presence of a paper sheet on the basis of the light-receiving level at the light-receiving portion.

Here, in the case of a paper sheet having different light transmission states and reflection states depending on the location, for example, the polymer banknote S(p) having a non-transparent region A1 and a transparent region A2, when the transparent region A2 provided in the polymer banknote S(p) is located on the optical path of the light emitted from the light-emitting portion 102 of the optical sensor 101, the light-receiving level of the light received by the light-receiving portion 103 becomes greater than a predetermined threshold value, and so there is a possibility of an erroneous determination that the polymer banknote S(p) does not exist even though the polymer banknote S(p) is present.

Therefore, the paper sheet detection device 105 according to the present embodiment sets a second threshold value to a value equal to or greater than the first threshold value for detecting the non-transparent region A1 of the polymer banknote S(p) and less than the target light-receiving level set as the target value of the light-receiving level in the light-receiving portion 103 when there is no banknote S including the polymer banknote S(p).

Thereby, due to the transparent region A2 of the polymer banknote S(b) being located on the optical path of the light emitted from the light-emitting portion 102, even if the light-receiving level of the light in the light-receiving portion 103 is equal to or greater than the first threshold value, when less than the second threshold value set to a value lower than the target light-receiving level, the paper sheet detection device 105 can determine that the polymer banknote S(p) exists or may exist.

Further, the paper sheet detection device 105 has the estimating portion 111 that estimates the presence of the banknote S, and adjusts the amount of light emitted from the light-emitting portion 102 so that the light-receiving level at the light-receiving portion 103 becomes the target light-receiving level in the absence of the banknote S when it is estimated by the estimating portion 111 that there is no banknote S after the light-receiving level at the light-receiving portion 103 is equal to or greater than the first threshold value and less than the second threshold value. Therefore, since the light-receiving level at the light-receiving portion 103 when there is no banknote S becomes the target light-receiving level, even if the transparent region A2 of the banknote S is located on the optical path of the light emitted from the light-emitting portion 102, the paper sheet detection device 105 can appropriately determine that the polymer banknote S(p) is present.

That is, in order to detect the transparent region A2, it is necessary to set the second threshold value to a value close to the light-receiving level of the light received by the light-receiving portion 103 in the absence of the banknote S. Due to dirt on the light-emitting portion 102 and deterioration of performance over time, the light-receiving level of the light-receiving portion 103 in the absence of the banknote S easily tends to be less than the set second threshold value. In this case, even if there is no banknote S, the light-receiving level of the light in the light-receiving portion 103 becomes less than the second threshold value, whereby a determination is made that the polymer banknote S(p) is present. On the other hand, the paper sheet detection device 105 adjusts the light-receiving level of the light at the light-receiving portion 103 to be the target light-receiving level in the absence of the banknote S, thus preventing such a situation. Therefore, it is possible to appropriately determine that the polymer banknote S(p) is present.

(2) It is constituted such that a reporting portion (operation display portion 60 and audio output portion 61) that reports information indicating the possibility that the banknote S exists when the light reception level at the light-receiving portion 103 is equal to or greater than the first threshold value and lower than the second threshold value is provided, and the estimating portion 111 estimates that there is no banknote S when, after information indicating the possibility that the banknote S exists is reported by the operation display portion 60 and the audio output portion 61, a confirmation operation for the report is input.

When configured thusly, the estimating portion 111 estimates it is highly probable that the banknote S has been extracted by the operator when, after information indicating the possibility that the banknote S exists is reported by the operation display portion 60 and the audio output portion 61, a confirmation operation for the report is input. Therefore, the estimating portion 111 can appropriately perform an estimation that there is no banknote S.

(3) It is constituted such that a reporting portion (operation display portion 60 and audio output portion 61) that reports information indicating the possibility that the banknote S exists when the light reception level of the light-receiving portion 103 is equal to or greater than the first threshold value and lower than the second threshold value, and the estimating portion 111 estimates that there is no banknote S when a certain period of time has elapsed after information indicating the possibility that the banknote S exists is reported by the operation display portion 60 and the audio output portion 61.

With this configuration, the estimating portion 111 estimates it is highly probably that the banknote S has been extracted by the operator when a certain period of time has elapsed after information indicating the possibility that the banknote S exists is reported by the operation display portion 60 and the audio output portion 61. Thereby, the estimating portion 111 can appropriately perform an estimation that there is no banknote S.

(4) The estimating portion 111 is constituted to estimate a change in the presence of the banknote S on the basis of the first light-receiving level at the light-receiving portion 103 at the first time and the second light-receiving level at the light-receiving portion 103 at the second time after the first time.

With such a configuration, the estimating portion 111 determines that there is no change in the presence of the banknote S when the difference between the first light-receiving level at the first time and the second light-receiving level at the second time in the time series is within a predetermined range, and determines that there is a change in the presence of the banknote S when the difference exceeds a predetermined range. Therefore, the estimating portion 111 can detect a change from a state in which it is determined that the banknote S may exist to a state in which the banknote S no longer exists by comparing the difference between the first light-receiving level of the light-receiving portion 103 at the first time when it is determined that the banknote S may exist and the light-receiving level of the light-receiving portion 103 at the second time thereafter. As a result, the paper sheet detection device 105 can determine whether or not the paper sheet has been extracted by an operator or the like.

(5) A constitution is such that the banknote S has a non-transparent region A1 and a transparent region A2, and the first threshold value is set to a value at which the non-transparent region A1 of the banknote S can be detected, and the second threshold value is set to a value at which the transparent region A2 of the banknote S can be detected.

With such a configuration, the paper sheet detection device 105 has a first threshold value capable of detecting the non-transparent region A1 and a second threshold value capable of detecting the transparent region A2, and so can appropriately detect the presence of a paper sheet having the transparent region A2 (for example, a polymer banknote).

(6) A constitution is such that the target light-receiving level in the case of the paper sheet S(p) having the transparent region A2 being estimated to not be present by the estimating portion 111 is set to a value lower than the target light receiving value in the case of the banknote S having the transparent region A2 being estimated to not be present by the estimating portion 111.

In the paper sheet detection device 105, a second threshold value for detecting the transparent region A2 is set between the first threshold value for detecting the non-transparent region A1 and the target light-receiving level set as the target value of the light-receiving level at the light-receiving portion 103 when the banknote S is not present. Here, when the target light-receiving level set in the absence of the banknote S(p) having the transparent region A2 is the same as or higher than the target light-receiving level set in the state of the banknote S not having the transparent region A2 not being present, the change in the light-receiving level in the gray determination area where the second threshold value for detecting the transparent region A2 is set becomes sudden, and so it may not be not possible to appropriately determine whether the light-receiving level is in the gray determination area. For that reason, in the paper sheet detection device 105 according to the present embodiment, by setting the target light-receiving level set after the banknote S(p) having the transparent region A2 is not present in the stacking portion 51 to be lower than the target light-receiving level set after the banknote S having no transparent region is not present in the stacking portion 51, the change in the light-receiving level in the gray determination area where the second threshold value is set becomes gradual, and it is possible to appropriately determine whether or not the light-receiving level is in the gray determination area.

(7) A constitution is such that the target light-receiving level can be changed when the banknote S(p) having the transparent region A2 is estimated by the estimating portion 11 to not be present.

With such a configuration, the presence of a paper sheet can be appropriately detected according to the type of paper sheet by making it possible to change the target light-receiving level.

(8) It is constituted such that a method of detecting a paper sheet (banknote S) that detects the presence of the banknote S with the optical sensor 101 having the light-emitting portion 102 and the light-receiving portion 103 is a method of setting a first threshold value used for determining whether the banknote S is present, a target light-receiving level set as a target value of the light-receiving level at the light-receiving portion 103 when the banknote S is not present, and a second threshold set to a value equal to or greater than the first threshold and lower than the target light-receiving level, and adjusting the amount of light emitted from the light-emitting portion 102 so that the light-receiving level in the light-receiving portion 103 becomes the target light-receiving level when it is estimated that the banknote S is absent in the case of the light-receiving level at the light-receiving portion 103 being equal to or greater than the first threshold value and lower than the second threshold value.

As a result, due to the transparent region A2 of the polymer banknote S(b) being located on the optical path of the light emitted from the light-emitting portion 102, even if the light-receiving level of light at the light-receiving portion 103 is equal to or greater than the first threshold value, if less than the second threshold value set to a value lower than the target light-receiving level, it is possible to determine that the polymer banknote S(p) exists or may exist.

The amount of light emitted from the light-emitting portion 102 is adjusted so that the light-receiving level in the light-receiving portion 103 becomes the target light-receiving level in the absence of the paper sheet S when it is estimated by the estimating portion 111 that there is no banknote S after the light-receiving level at the light-receiving portion 103 is equal to or greater than the first threshold value and less than the second threshold value. Thereby, since the light-receiving level at the light-receiving portion 103 when there is no banknote S becomes the target light-receiving level, even when the transparent region A2 of the banknote S is located on the optical path of the light emitted from the light-emitting portion 102, it is possible to appropriately determine that the polymer banknote S(p) is present.

(9) It is constituted such that information indicating the possibility that the banknote S is present is reported when the light-receiving level of the light in the light-receiving portion 103 is equal to or greater than the first threshold value and less than the second threshold value, and it is estimated that there is no banknote S when the confirmation operation is input for the reporting after information indicating the possibility that the banknote S exists is reported.

When configured thusly, the estimating portion 111 can estimate that it is highly probable that the banknote S has been extracted by the operator when, after information indicating the possibility that the banknote S exists is reported by the operation display portion 60 and the audio output portion 61, a confirmation operation for the report has been input. Therefore, the estimating portion 111 can appropriately perform an estimation that there is no banknote S.

The paper sheet processing device 1 that sorts paper sheets (banknotes S) that have been charged into the receiving portion 11 under a predetermined condition and stacks the paper sheets in stacking portions 51 is constituted to have an identifying and counting portion 22 that performs identification and counting of the banknotes S, and the sorting portion 46 that sorts to the predetermined stacking portion 51 the banknotes S that have been identified and counted by the identifying and counting portion 22, and the paper sheet detection device 105 according to any one of (1) to (8) being provided in the stacking portion 51.

When configured thusly, by providing the paper sheet detection device 105 in the stacking portion 51 of the paper sheet processing device 1, it is possible to satisfactorily detect the remainder of polymer banknotes S(p) stacked in the stacking portion 51.

INDUSTRIAL APPLICABILITY

The present invention may be applied to a paper sheet detection device, a paper sheet detection method, and a paper sheet processing device.

REFERENCE SYMBOLS

1: Paper sheet processing device
60: Operation display portion (reporting portion)
61: Audio output portion (reporting portion)
101: Optical sensor
102: Light-emitting portion
103: Light-receiving portion
105: Paper sheet detection device
111: Estimating portion
112: Light amount adjusting portion
A1: Non-transparent region
A2: Transparent region
S: Banknote (paper sheet)
S(p): Polymer banknote

The invention claimed is:

1. A paper sheet detection device comprising:
an optical sensor that includes a light-emitting portion that emits light, and a light-receiving portion that receives the emitted light;
a storage portion that stores a first threshold value used for determining whether or not a paper sheet is present in a path of the emitted light, a target light-receiving level set as a target value of a level of the light received by the light-receiving portion in a state where the paper sheet is not present, and a second threshold value that is set to a value that is greater than the first threshold value and less than the target light-receiving level;
an estimating portion that determines whether the level of the light received by the light-receiving portion is equal to or greater than the first threshold value and less than the second threshold value, and that estimates whether or not the paper sheet is present; and
a light amount adjusting portion that adjusts an amount of the light emitted by the light-emitting portion so that the level of the light received by the light-receiving portion becomes the target light-receiving level in the state where the paper sheet is not present when the estimating portion estimates that the paper sheet is not present after the estimating portion determines that the level of the light received by the light-receiving portion is equal to or greater than the first threshold value and less than the second threshold value.

2. The paper sheet detection device according to claim 1, further comprising:
a reporting portion that reports information indicating that there is a possibility that the paper sheet is present when the level of the light received by the light-receiving portion is determined to be equal to or greater than the first threshold value and lower than the second threshold value; and
an operation portion that receives a confirmation operation for the reporting,
wherein the estimating portion estimates that the paper sheet is not present when the confirmation operation has been received by the operation portion.

3. The paper sheet detection device according to claim 1, further comprising:
a reporting portion that reports information indicating that there is a possibility that the paper sheet is present when the level of the light received by the light-receiving portion is determined to be equal to or greater than the first threshold value and lower than the second threshold value,
wherein the estimating portion estimates that the paper sheet is not present when a certain period of time has elapsed since the information is reported.

4. The paper sheet detection device according to claim 1, wherein the estimating portion estimates whether or not the paper sheet is present based on a first light-receiving level that is the level of the light received by the light-receiving portion at a first time and a second light-receiving level that is the level of the light received by the light-receiving portion at a second time after the first time.

5. The paper sheet detection device according to claim 1, wherein the paper sheet includes a non-transparent region and a transparent region, and
the first threshold value is set to a value at which the non-transparent region of the paper sheet is detectable, and the second threshold value is set to a value at which the transparent region of the paper sheet is detectable.

6. The paper sheet detection device according to claim 5, wherein the target light-receiving level is set to a value lower than a target value of the level of the light received by the light-receiving portion in a state of a paper sheet without a transparent region not being present in the path of the emitted light.

7. The paper sheet detection device according to claim 5, wherein the target light-receiving level is changeable.

8. A paper sheet processing device comprising:
the paper sheet detection device according to claim 1;
a receiving portion that receives charging of the paper sheet;
a stacking portion that is provided with the paper sheet detection device and that stores the paper sheet;
an identifying and counting portion that identifies and counts the paper sheet; and
a sorting portion that sorts the paper sheet that have been identified and counted by the identifying and counting portion to the stacking portion.

9. A paper sheet detection method comprising:
emitting light by a light-emitting portion;
receiving the emitted light by a light-receiving portion;
determining whether a level of the light received by the light-receiving portion is equal to or greater than a first threshold value and less than a second threshold value, the first threshold value being used for determining whether or not a paper sheet is present in a path of the emitted light, the second threshold value being set to a value less than a target light-receiving level set as a target value of the level of the light received by the light-receiving portion in a state where the paper sheet is not present;
estimating whether or not the paper sheet is present; and
adjusting an amount of the light emitted by the light-emitting portion so that the level of the light received by the light-receiving portion becomes the target light-receiving level in the state where the paper sheet is not present when it is estimated that the paper sheet is not present after it is determined that the level of the light received by the light-receiving portion is equal to or greater than the first threshold value and less than the second threshold value.

10. The paper sheet detection method according to claim 9, further comprising:

reporting information indicating that there is a possibility that the paper sheet is present when the level of the light received by the light-receiving portion is determined to be equal to or greater than the first threshold value and less than the second threshold value; and receiving a confirmation operation for the reporting, wherein it is estimated that the paper sheet is not present when the confirmation operation has been received.

\* \* \* \* \*